United States Patent
Barrett

(10) Patent No.: US 9,363,139 B2
(45) Date of Patent: Jun. 7, 2016

(54) MOBILE COMMUNICATIONS NETWORK, INFRASTRUCTURE EQUIPMENT AND METHOD

(71) Applicant: SCA IPLA HOLDINGS INC., New York, NY (US)

(72) Inventor: Stephen John Barrett, Thatcham (GB)

(*) Notice: Subject to any disclaimer, the term of this patent is extended or adjusted under 35 U.S.C. 154(b) by 171 days.

(21) Appl. No.: 14/165,322

(22) Filed: Jan. 27, 2014

(65) Prior Publication Data

US 2014/0140279 A1     May 22, 2014

Related U.S. Application Data

(63) Continuation of application No. PCT/GB2012/051764, filed on Jul. 23, 2012.

(30) Foreign Application Priority Data

| Jul. 29, 2011 | (GB) | 1113144.8 |
| Jul. 29, 2011 | (GB) | 1113145.5 |
| May 29, 2012 | (GB) | 1209526.1 |

(51) Int. Cl.

| *H04L 12/24* | (2006.01) |
| *H04W 4/00* | (2009.01) |
| *H04W 4/14* | (2009.01) |
| *H04W 8/08* | (2009.01) |

(52) U.S. Cl.
CPC ........... *H04L 41/0806* (2013.01); *H04W 4/005* (2013.01); *H04W 4/14* (2013.01); *H04W 8/08* (2013.01)

(58) Field of Classification Search
CPC H04W 4/14; H04M 1/72552; H04L 12/5895; H04L 29/06; H04L 67/04
See application file for complete search history.

(56) References Cited

U.S. PATENT DOCUMENTS

| 7,558,220 B2 * | 7/2009 | Chambers et al. ............ 370/260 |
| 2010/0165940 A1 | 7/2010 | Watfa et al. |
| 2012/0087274 A1 | 4/2012 | Meriau |

FOREIGN PATENT DOCUMENTS

| EP | 2 299 764 A1 | 3/2011 |
| JP | 2007-524306 | 8/2007 |

(Continued)

OTHER PUBLICATIONS

U.S. Appl. No. 14/165,298, filed Jan. 27, 2014, Barrett.

(Continued)

*Primary Examiner* — Chandrahas Patel
(74) *Attorney, Agent, or Firm* — Oblon, McClelland, Maier & Neustadt, L.L.P.

(57) ABSTRACT

A mobile communications network configured to establish communications bearers communicating data packets to/from mobile communications terminals via a radio network and core network, each communications bearer established using context information associated with one or more connections from mobile communications terminals to destination addresses, or to the mobile communications terminals from source addresses. A mobile communication terminals can, in an idle state, communicate a short message data packet to a base station of the radio network as a signalling message, using predetermined parameters configuring a transmitter of the mobile communications terminal, corresponding with parameters with which a receiver in the base station can receive the short message data packet, which includes an indication of context information used by the mobile communications network for communicating the short message data packet to a mobility manager of the mobile communications network. The short message data packet can be communicated context-less or quasi-context-less.

14 Claims, 21 Drawing Sheets

(56) References Cited

FOREIGN PATENT DOCUMENTS

| JP | 2011-509592 | 3/2011 |
| WO | WO 2010/033398 A1 | 3/2010 |
| WO | WO 2010/033457 A1 | 3/2010 |
| WO | WO 2011/051753 A1 | 5/2011 |

OTHER PUBLICATIONS

Search Report issued Nov. 19, 2011 in United Kingdom Patent Application No. GB 1113144.8.

Search Report issued Nov. 19, 2011 in United Kingdom Patent Application No. GB 1113145.5.

Search Report issued Sep. 24, 2012 in United Kingdom Patent Application No. GB1209526.1.

International Search Report issued Oct. 15, 2012 in PCT/GB2012/051764.

"Evaluations for SMS Optimization" Qualcomm Incorporated, 3Gpp TSG SA WG2 Meeting # 86, vol. TD S2-113374, XP050548649, Jul. 11-15, 2011, 4 Pages.

Japanese Office Action issued Feb. 16, 2016 in Japanese Patent Application No. 2014-523381.

* cited by examiner

MOBILE COMMUNICATIONS NETWORK, INFRASTRUCTURE EQUIPMENT AND METHOD

CROSS-REFERENCE TO RELATED APPLICATIONS

The present application is a continuation of international application PCT/GB2012/051764 filed Jul. 23, 2012, and claims priority to British Patent Applications 1113145.5 and 1113144.8, both filed in the UK IPO on Jul. 29, 2011, and British Patent Application 1209526.1 filed in the UK IPO on May 29, 2012, the entire contents of each of which are being incorporated herein by reference.

FIELD OF THE INVENTION

The present invention relates to mobile communications networks for communicating data packets to and/or from mobile communications terminals, infrastructure equipment, base stations, mobile communications terminals and methods for communicating data packets.

BACKGROUND OF THE INVENTION

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of terminals and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication terminals (i.e. MTC terminals) communicating small amounts of data on a relatively infrequent basis. Thus the use of an MTC terminal may differ from the conventional "always-on" use case for conventional LTE terminals. Examples of MTC terminals include so-called smart meters which, for example, are located in a customer's house and periodically transmit information back to a central MTC server data relating to the customers consumption of a utility such as gas, water, electricity and so on. In the example of a smart meter, the meter may both receive small data transmissions (e.g. new price plans) and send small data transmissions (e.g. new reading) where these data transmissions are generally infrequent and delay-tolerant transmissions. Characteristics of MTC terminals may include for example one or more of: low mobility; time controlled; time tolerant; packet switched (PS) only; small data transmissions; mobile originated only; infrequent mobile terminated; MTC monitoring; priority alarm; secure connection; location specific trigger; network provided destination for uplink data; infrequent transmission; and group based MTC features (for example: group based policing and group based addressing). Other examples of MTC terminals may include vending machines, "sat nav" terminals, and security cameras or sensors, etc.

Mobile networks developed recently are generally well adapted to high-rate and high reliability services and may not always be well suited to MTC services.

SUMMARY OF THE INVENTION

According to the present invention there is provided a mobile communications network for communicating data packets to or from one or more mobile communications terminals. The mobile communications network comprises a radio network part including a plurality of base stations for communicating data packets to or from the mobile communications terminals via a radio access interface, and a core network part which is configured to communicate the data packets to destination addresses from the radio network part or to communicate the data packets to the radio network part from source addresses. The mobile communications network is configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses. One of the mobile communications terminals is configured when in an idle state, to communicate a short message data packet to the base station of the radio network part as a signalling message, using predetermined parameters for configuring a transmitter of the mobile communications terminal, which correspond with parameters with which a receiver in the base station is configured to receive the short message data packet, the short message data packet including an indication of context information for use by the mobile communications network for communicating the short message data packet to a mobility manager of the mobile communications network.

Embodiments of the present invention can provide an arrangement for communicating a data packet in a "context-less" or "quasi-context-less" manner without a communications bearer being established or established only temporarily between the communications terminal and the base station and from the base station to a mobility manager as a signalling message, thereby reducing an amount of signalling overhead required, which can be an efficient way of communicating relatively small amounts of data. Embodiments of the present invention one example can be used for communicating small amounts of data from more simple devices such as those deployed for MTC types applications.

There are a variety of system architecture options for the delivery of small MTC messages. One option is to establish an internet protocol (IP) connection between the communications terminal and an MTC server. The provision of a conventional IP stack at a mobile communications terminal may be attractive from an application development point of view. However, the overhead associated with connection oriented signalling which is required to establish user plane bearers and to manage the core network tunnels during mobility may be excessive when potentially only a few bytes of application data need to be transferred. Another option, and one that is utilised by many existing GSM/UMTS wide area cellular MTC applications, is to make use of the short message service. With SMS, messages are carried over the control plane and a signalling overhead associated with establishing user plane connections and their associated tunnels can be avoided. An advantage of SMS is the provision of store and forward functionality in the SMS Service Centre (SMS-SC), which means that if a communications terminal is out of coverage or has run out of power then the message will be buffered awaiting the time when the terminal comes back into coverage or re-attaches. In 3GPP LTE Release 10, SMS over LTE is facilitated either through interconnection between the MME and a legacy 2G/3G core network (so-called SMS over SGs) or by inter-connection between a communications terminal and a legacy SMS-GMSC/SMS-IWMSC using IMS connectivity supported over an IP PDN connection.

Embodiments of the present invention can provide methods of enhancing SMS which reduce signalling overhead by avoiding establishment of access stratum (AS) security and instead relying on security provided by the non access stratum (NAS). Likewise, alternatives to network controlled handover based mobility management may also be appropriate when only small amounts of traffic are being conveyed.

In some examples the context information provided in the short message packet includes an identifier of the mobile communications terminal, the identifier having been provided to the mobile communications terminal by the mobile communications network, when the mobile communications terminal attached to the base station of the mobile communications network. Therefore by arranging for the communications terminal to including the identifier in the short message data packet, the base station can recognise that there is no context available for communicating the short message data packet and use a default context or communications bearer for communicating the data packet. If the base station also treats the short message data packet as a signalling message then the base station can establish a context for communicating the short message data packet to a mobility manager. In one example, the identifier of the mobile communications terminal is a temporary international mobile subscriber identity number or a representation thereof. In another example the short message data packets includes a field identifying the short message data packet to the base station, which therefore recognises that the short message should be communicated to the mobility manager.

In some embodiments the base station establishes temporarily a radio bearer for communicating the short message data packet between the communications terminal and the base station, the radio bearer being removed after the short message data packet has been received by the base station. The radio bearer may be a default radio bearer or may be established after an exchange of messages between the communications terminal and the base station.

Various further aspects and features of the present invention are defined in the appended claims and include a base station, a mobile communications terminal and methods.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

The example embodiments will be generally described in the context of a 3GPP LTE architecture. However, the invention is not limited to an implementation in a 3GPP LTE architecture. Conversely, any suitable mobile architecture is considered to be relevant.

Conventional Network

Figure 1:
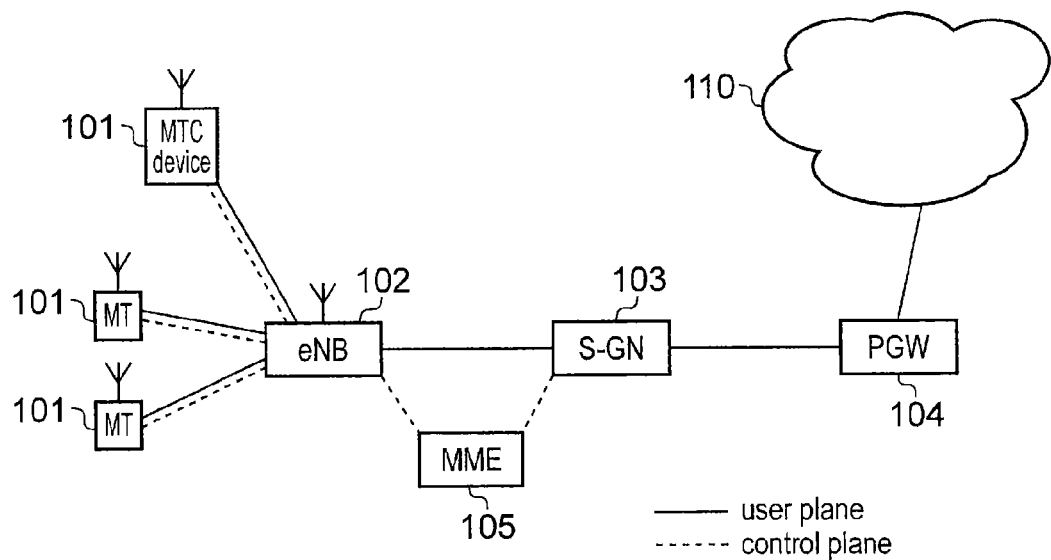
FIG. 1 is a schematic block diagram of a mobile communications network according to the LTE standard.

FIG. 1 provides a schematic diagram illustrating the basic functionality of a conventional mobile telecommunications network. The network includes one or more base stations 102 (one base station represented) connected to a serving gateway (S-GW) 103 for traffic in the user plane and to a Mobility Management Entity (MME) for signalling in the control plane. In LTE, the base stations are called e-NodeB, which are referred to in the following description as eNB. Each base station provides a coverage area 103 within which data can be communicated to and from mobile terminals 101. Data is transmitted from a base station 102 to a mobile terminal 101 within a coverage area via a radio downlink. Data is transmitted from a mobile terminal 101 to a base station 102 via a radio uplink. The core network, comprising the MME 105, the S-GW 103 and the PDN-Gateway (P-GW) 104, routes data to and from the mobile terminals 101 and provides functions such as authentication, mobility management, charging and so on. The P-GW is connected to one or more other networks, which may for example include the internet, an IMS core network, etc. In the illustration of FIG. 1, connections on the user plane have been represented with a plain line while connections on the control plane have been represented with a dashed line.

Figure 2:
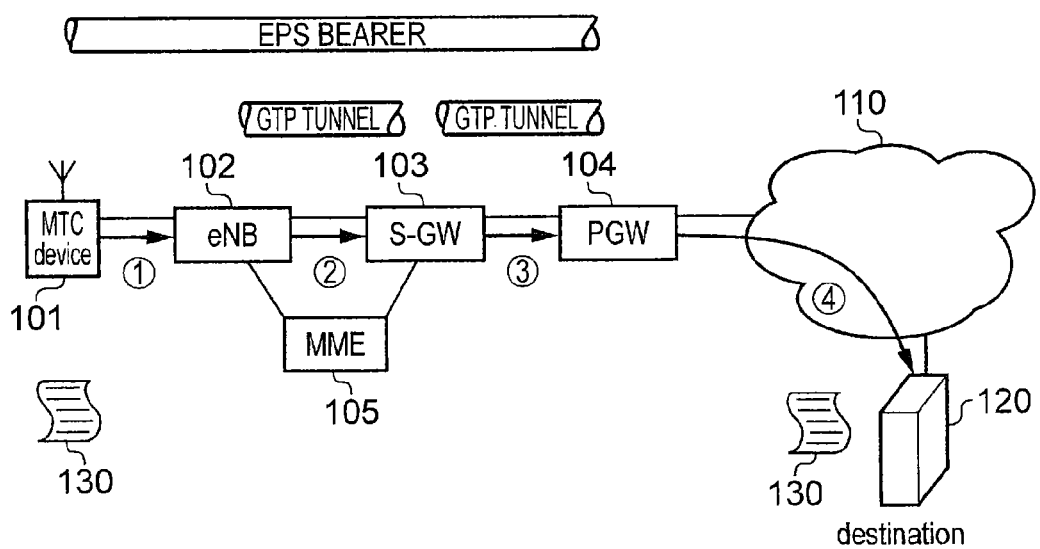
FIG. 2 illustrates an example of a path followed by a message sent by a terminal in a conventional network.

FIG. 2 illustrates an example of a path followed by a message 130 communicated by a mobile terminal 101. In that example an MTC terminal 101, wishes to send the message 130 to a destination 120, the destination being reachable via the internet. In this example, a destination device is represented as a computer. However the destination 120 could be an element of any suitable type where the element can be addressed by the mobile terminal 101. For example, the destination device 120 may be another terminal, a personal computer, a server, a proxy, or an intermediary element (to a final destination).

The following description provides a summary explanation of an example of operation in which a mobile terminal communicates the message 130 via an LTE network, which is helpful in appreciating some aspects and advantages of the present technique.

In order for the mobile terminal 101 to send data to a destination, an EPS bearer between the terminal 101 and the PGW 104 is set up, the EPS bearer being partially carried over a GTP tunnel between the cNB 102 and the SGW and another GTP tunnel between SGW and PGW 104, as illustrated in FIG. 2. As the message 130 is carried to the destination device, it is sent from the terminal 101, at a first end of an EPS bearer to the eNB 102 (step 1), then to the S-GW 103 (step 2) and then to the P-GW 104 (step 3), at the other end of the EPS bearer. The P-GW 104 then forwards the message 130 to the destination 120 (step 4).

Figure 3:
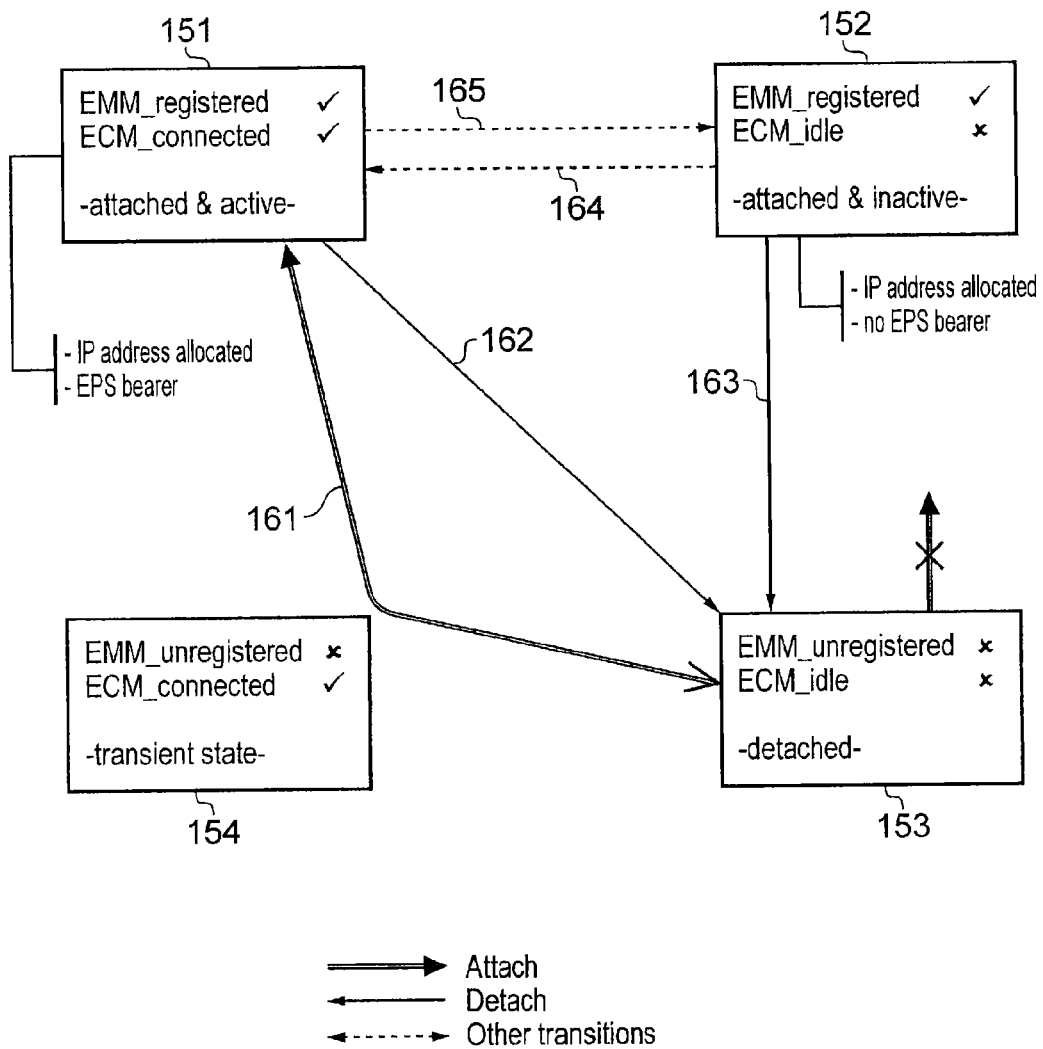
FIG. 3 is an illustration of transitions between EMM and ECM states in a conventional LTE network.

FIG. 3 illustrates the various transitions between the four possible combinations of ECM states (connected or idle) and EMM states (registered or unregistered) as defined in the LTE standards for a terminal with a view to illustrating how terminals' connections are managed. The acronym ECM stands for "EPS Connection Management" and the ECM state generally indicates whether the terminal has a Non-Access Stratum (NAS) connection set up with the MME. In LTE, as the terminal connects to the MME and switches to ECM_connected, it also sets up an EPS bearer, that is, a data connection to the P-GW via the S-GW. Also, as the terminal switches from ECM_connected to ECM_idle, the EPS bearer is torn down, and all S1 and RRC connections are released. The acronym EMM stands for "EPS Mobility Management" and the EMM state generally indicates whether a terminal is attached to the network. When the terminal is in EMM_unregistered, it may for example be turned off, out of coverage or connected to a different network. In contrast, when a terminal is in EMM_registered, it is attached to the network and, as such, it has an IP address and a NAS security context in the MME. It may or may not have an EPS bearer set up, but in any case, it has some context associated with it in the MME (e.g. NAS security context) and in the P-GW (e.g. the IP address). In addition the MME will know in which tracking areas the UE is located. The four ECM/EMM states and the transitions between them is described next.

The mobile terminal 101 is assumed to start from a state 153 in which the mobile terminal 101 is not connected to the network. In the state 153, the terminal is in EMM_unregistered and ECM_idle states. From this state, the terminal can attach to the network to be in EMM_registered and ECM_connected states. However, in order to attach, the terminal cannot switch to EMM_registered if it has not switched to ECM_connected first. In other words, starting from state 153, the terminal cannot go to states 152 or 151 and it has to go to state 154 first. Therefore, as illustrated by arrow 161, a terminal in state 153 can attach to the network by first switching to ECM connected and then to EMM_registered. As a terminal starts an attachment procedure from state 153, the terminal moves from a state 153 where it does not have any connection to a state 151 where it has a NAS connection to the MME, an IP address allocated by the P-GW, and a EPS bearer to the P-GW via the e-NB and the S-GW.

Transitions between states 151 and 152 occur when a data connection (EPS bearer) is set up (164) or when all data connections have been released (165). Generally, transition 165 occurs when the user had an EPS bearer active and has not been using the bearer for a certain time. The network can then decide that the terminal no longer needs an EPS bearer and thus release all the corresponding resources and switch the terminal to ECM_idle. Transition 164 generally occurs when the terminal has not been using any EPS bearer (see for example the discussion on transition 164) and now has data to send or receive. An EPS bearer is then set up for this terminal and it is switched to ECM_connected. Whenever the terminal is EMM_registered, regardless of the ECM states, the terminal will have an IP address that can be used to reach the terminal, in other words an IP context remains active even if no actual EPS bearer is currently active (e.g. state 152).

If the terminal detaches from the network, for example because it is turned off, moving to a different network, or for any other reason, it will switch from any state it is into state 153, releasing any outstanding EPS bearer or context that was previously maintained for the terminal, via transitions 162 or 163.

As can be understood, the state 154 where the terminal is in ECM_connected and in EMM_unregistered is a transient state and the terminal does not generally remain in that particular state. A terminal in that state is either a terminal switching from state 153 (detached and inactive) to state 151 (attached and active) or a terminal switching from state 151 to state 153.

RRC states are also provided to reflect the status of the RRC connection between the terminal and the eNB (RRC_connected and RRC_idle). Under conventional operation conditions, the RRC states correspond to the ECM states: if the terminal is in ECM_connected, it should also be in RRC_connected and if it is in ECM_idle, it should also be in RRC_idle. Discrepancies between ECM and RRC states may occur for a short period of time as a connection is being set-up or torn-down.

Figure 4:
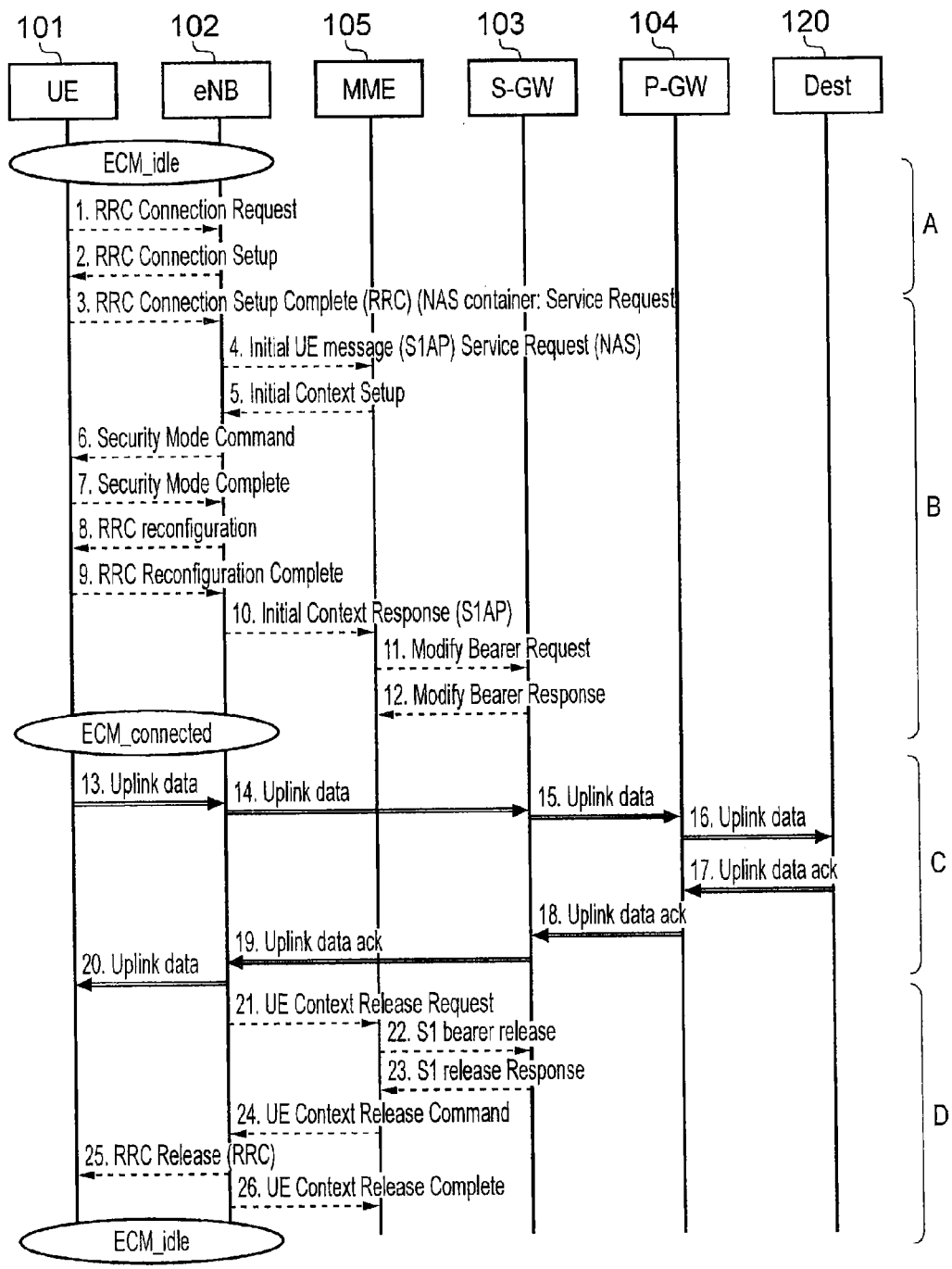
FIG. 4 is an illustration of a possible call flow corresponding to FIG. 2.

FIG. 4 illustrates an example of the messages exchanged for setting up a connection from the terminal 101 to the destination 120, for using the connection to communicate data and for releasing the connection after the communications between the terminal 101 and the destination 120 have been completed. The call flow of FIG. 4 can be schematically divided into four steps A-D. Before step A starts, the terminal 101 is in the ECM_idle state which means that the terminal 101 is not currently communicating. At step A (messages 1-3) an RRC connection is set up between the terminal 101 and the eNB 102 for controlling communications between the terminal 101 and the eNB 102. Once this RRC connection has been successfully established, at step B (messages 3-12), the terminal 101 can establish a NAS connection with the MME 105. Following this NAS connection request from the terminal 101 to the MME 105, the MME sets up a connection (e.g. EPS bearer) between the terminal 101 and the P-GW 104, via the S-GW 103 and the eNB 102, and controls this connection. Although they have not been represented here, messages may also be sent to the P-GW 104, for example from the S-GW 103, for setting up the connection (e.g. EPS bearer) at the P-GW 104, for example the GTP tunnel and EPS bearer. At the end of step B, the terminal 101 has an EPS bearer set-up and available to send and receive messages and is therefore in the ECM-connected state. The call flow of FIG. 4 is an illustration and some of the messages may vary, for example depending on the EMM state before step A. For example, the terminal may be in EMM_unregistered state and switch to EMM_registered during step B, or may already be in EMM_registered before step A starts.

Once this connection (e.g. EPS bearer) has been set up, the terminal 101 can use the connection to send the message 130 to the destination 120 (step C). In the example illustrated in FIG. 4, the message 130 sent via messages 13-16 and is followed by an acknowledgement message to confirm that the message 130 has been received by the destination 120 and/or its final destination. In other example, messages 13-16 may not be followed by any acknowledgement messages as this is likely to depend on the protocol used for sending the message 130. The scenario shown in FIG. 4 may be applicable where an application layer protocol running over UDP requires an acknowledgement to be sent.

At a point in time after completion of step C, the resources are released (step D). Step D could happen at any time after step C, for example just after message 20, or at a later point in time, for example after the terminal 101 stopped communicating for a predetermined time. The aim of step D is to release all unused connections, that is, to release the NAS connection between the MME 105 and the terminal 101 (also leading to the release of resources such as the GTP tunnel between S-GW and eNB and the EPS bearer), and to release the RRC connection between the terminal 101 and the eNB 102. Again, depending on whether the terminal 101 should remain in EMM_registered after step D or should switch to EMM_unregistered, the call flow for step D is likely to be affected. For example, the terminal 101 may remain in EMM_registered if the terminal simply releases the RRC connection, NAS connection and EPS bearer because it has been inactive for too long, or the terminal 101 may de-attach from the network and switch to EMM_unregistered (for example following a handover to a GSM network).

In the event that the terminal 101 has to send and/or receive large amount of data, this connection method can be efficient in setting up a high-throughput connection to the P-GW for transmitting such data. It is however based on the exchange of a large number of signalling messages between different parties and the setup of a large number of advanced connections (RRC, NAS, EPS, etc), which may render the system inefficient if the terminal's transmission is actually a brief and small transmission, which is likely to be the case for an MTC type applications. Furthermore, MTC type applications are likely to require reduced functionality in comparison to conventional mobile terminals, in order to reduce the cost of producing such devices. This is because it is envisaged that MTC devices will be more ubiquitous and utilitarian then conventional mobile terminals and therefore should be less expensive to produce in order to be attractive to use mobile communications networks to transmit and receive data. Accordingly, the present technique aims to provide an advantage of adapting conventional mobile communications techniques, particularly in respect of data communications in order to reduce a complexity and therefore a cost of implementing mobile terminals which use the techniques as provided by an adapted mobile communications network. This is because recent networks, including LTE networks, have been designed for high-capabilities and high-mobility terminals and, as a result, they usually provide for the setup of a high-speed high-reliability connection with an advanced mobility management with a view to supporting terminals potentially transmitting large amount of data while moving. However, in the case of a terminal that is not moving as much as a personal phone and/or transmits only small amount of data on a relatively infrequent basis, the amount of signalling and of mobility tracking required for the terminal to communicate may be excessive. In particular, it may be excessive compared to the sometimes low level of service that may be acceptable for this type of terminals. For example MTC terminals are more delay-tolerant than a human-to-human terminal, are less likely to move and/or to change cell during transmissions and usually send or receive small amount of data.

It may therefore be desirable to provide ways to improve an efficiency of the network for transmitting small messages and/or MTC communications. The following sections provide different example techniques which form aspects and features of the present technique.

Transmission of Short Messages

In LTE, SMS can currently be supported in two ways. In the first method the short message is conveyed via an Application Server (AS), called an IP Short Message Gateway (IP-SM-GW), in the IMS core which provides an inter-working function into the legacy SMS network. For example, when the terminal wishes to send a SMS in LTE, it will then set-up an EPS bearer as discussed above and will send the SMS through the EPS bearer and to the IMS core's IP-SM-GW. Likewise, if the terminal is to receive a SMS, the network will trigger an EPS bearer set-up and the IMS core's IP-SM-GW will then forward the SMS to the terminal through the EPS bearer. As discussed above, a large number of messages have to be exchanged for setting up and tearing down at least the RRC connection, the NAS connection and the EPS bearer which makes the sending and receiving of infrequent short messages very inefficient. Of course, in the case of a personal phone, the user is likely to take full advantage of the "always-on" approach and the user may have most of the time an EPS bearer already set-up for other services as well (e.g. emails, web browsing, etc.). However, MTC terminals may have to send only one short message and this may be the only data sent or received for a long period of time. In that case, setting-up an RRC connection, a NAS connection and an EPS bearer for sending a short message to the IMS core is very inefficient when using SMS over IMS.

In case the mobile network is not connected to an IMS core or the UE does not have IMS functionality, a transition solution has been proposed under the name "SMS over SGs" for transferring a SMS message to the legacy and circuit-switched (CS) core via a SGs interface between the MME and an MSC. Short messages are conveyed between the MME and the UE using control plane protocols including RRC and NAS. Because Packet Switched-only mobile networks have been designed for high-capacity and high-usage terminals, it is therefore assumed that if a terminal sends a service request, a high capacity data path (e.g. an EPS bearer) will be setup for the terminal's use, not necessarily limited to the use of the service that triggered the service request. This path may be thus used by the terminal for accessing one or more services (e.g. web browsing, emails, etc.) so that the terminal is in "always-on" mode and does not need to set up a new bearer for every new service. Therefore, as the terminal informs the network of its wish to use the mobile network to communicate (for example sending an SMS message) or as the network detects that it has data to communicate with the terminal (for example an SMS message), a data path is set up first before the terminal can start communicating using the mobile network. As a result, according to SMS over SGs, a terminal sending a SMS should first perform a full attachment to the network, including the setup of an RRC connection, NAS connection and an EPS bearer before it sends a SMS to the legacy SMSC in the 2G/3G network, via the MME. This fallback solution uses a new interface SGs between a MME and a MSC. As for SMS over IMS, the terminal should first set up all connections, including RRC, NAS and EPS before it can send or receive a SMS.

In other words, because of the way that recent networks have been designed, any time that a terminal has data to send or receive, a full PS data path (for example an EPS bearer) is set up before everything, which include setting up other connections as well (e.g. RRC and NAS) and only then data can be communicated. Such an approach may be appropriate for high-throughput and high-usage terminals but is less suitable for MTC terminals. For example, the amount of signalling compared to the amount of data to be transmitted is disproportionate. Also, the various elements involved all have to maintain connection information called "context" which relate to information that may not be needed in the specific case of MTC terminals having only brief communications. For example, the advanced mobility services provided by the network involve a significant amount of signalling and context which could be reduced with less advanced and more tailored mobility. Accordingly, an alternative solution for sending short messages is proposed so as to improve the efficiency of the sending of short messages.

It is proposed that short messages be sent without setting up the full RRC and NAS connections and be sent in a signalling packet on the control plane rather than on the user plane. The amount of signalling, context and mobility management can thus be reduced, thereby improving the efficiency of the network for MTC terminals.

Connection and Context for Sending Short Messages

Figure 5:
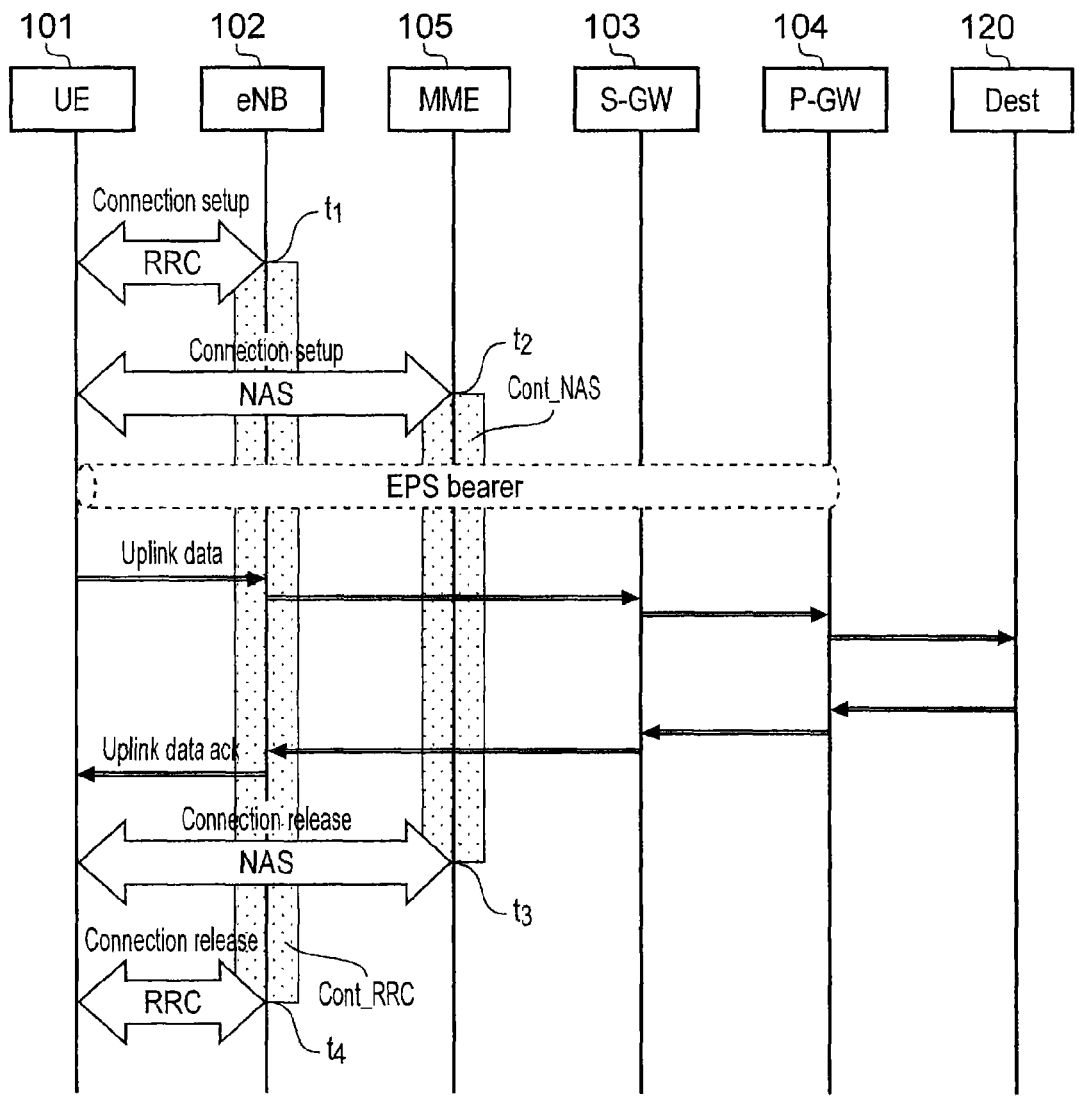
FIG. 5 is a schematic illustration of FIG. 4.

In order to better illustrate the simplification for the connections and contexts, the call flow of FIG. 4 can be schematically represented as in FIG. 5. At first, a RRC connection is setup between the terminal 101 and the eNB 102. Once this RRC connection has been set up, at time $t_1$, the eNB maintains an RRC context, referred to as Cont_RRC, for the duration of the RRC connection. In other words, until the RRC is released, the eNB will maintain this Cont_RRC. Such a context may for example include a terminal identifier (e.g. C-RNTI), power control settings, mobility settings, security settings, other radio settings or any other information. There will also be a corresponding context in the UE storing similar information pertaining to the operation of the radio layers, however, this is not shown in the diagram.

Once the RRC connection has been set up, a NAS connection is set up between the terminal 101 and the MME 105. Once this NAS connection has been set up, at time $t_2$, the MME 105 maintains a context for this NAS connection to the terminal 101, referred to as Cont_NAS, for the duration of the NAS connection. Such a NAS context may for example include a terminal identifier, a terminal's IP address, a current eNB, mobility settings, security settings, QoS settings, or any other information. As explained above, when the terminal 101 attaches/sets up a data connection via the mobile network, an EPS bearer is set up in the user plane between the terminal and the P-GW 104, the bearer being controlled in the control plane by the MME 105. There will also be a context in the UE storing UE related information pertaining to the NAS protocol. Note that the context Cont_NAS shown in the diagram as being stored at the MME, may include more information than just that used by or transferred in EPC NAS signalling procedures, it may also contain information pertaining to the session which has been gathered by the MME from for example, an HSS.

Once the RRC connection, the NAS connection and the EPS bearer have been set up, the terminal can send uplink data through the EPS bearer and to the destination. Even though in the example of FIG. 5, the terminal 101 sends uplink data, the same connection setup would occur for a downlink or for an uplink and downlink transmission. Likewise the path of an acknowledgement message has been illustrated in the example of FIG. 5 even though there may not be any acknowledgement message in other examples. As discussed earlier, this may for example be dependent upon the type of protocol(s) used for transmitting the data. As can be seen in FIG. 5, Cont_RRC and Cont_NAS are maintained for the duration of the RRC and NAS connection (i.e. until they are expressly released with a connection release message exchange) and, as a result, the RRC context is used for every packet that eNB 101 receives from or sends to the terminal 101. Once the EPS bearer can be released, the NAS connection between the terminal 101 and the MME 105 is released at the same time. As a result, at the time $t_3$ where the NAS connection is released, the context Cont_NAS is also released. The tearing down of the NAS connection is followed by a tearing down of the corresponding RRC connection at time $t_4$. Again, as the RRC connection is released, the context Cont_RRC is also released.

Generally according to embodiments of the present technique the short messages are sent in a context-less or quasi-context-less manner. In one example, the terminal may send a message prior to the establishment of any NAS connection between the terminal and the MME, thereby reducing the signalling but also the level of service for the terminal. In another example, the terminal may send a message prior to the establishment of any RRC connection between the terminal and the eNB, thereby also reducing the signalling but also the level of service for the terminal. In further examples, the terminal may send a message after a temporary RRC and/or NAS connection has been set-up, with for example limited features, where the connection is only set up for a predetermined number of messages or for no more than a predetermined number of messages, the number being any number greater than or equal to one. In one example, it may be set up for one message only, in another example it may be set up for the duration of a two-message exchange. It is intended that any suitable combination of the establishment of a partial connection and of the absence of connection establishment for the RRC connection and the NAS connection be considered under the present disclosure. Various combinations are considered below.

Figure 6:
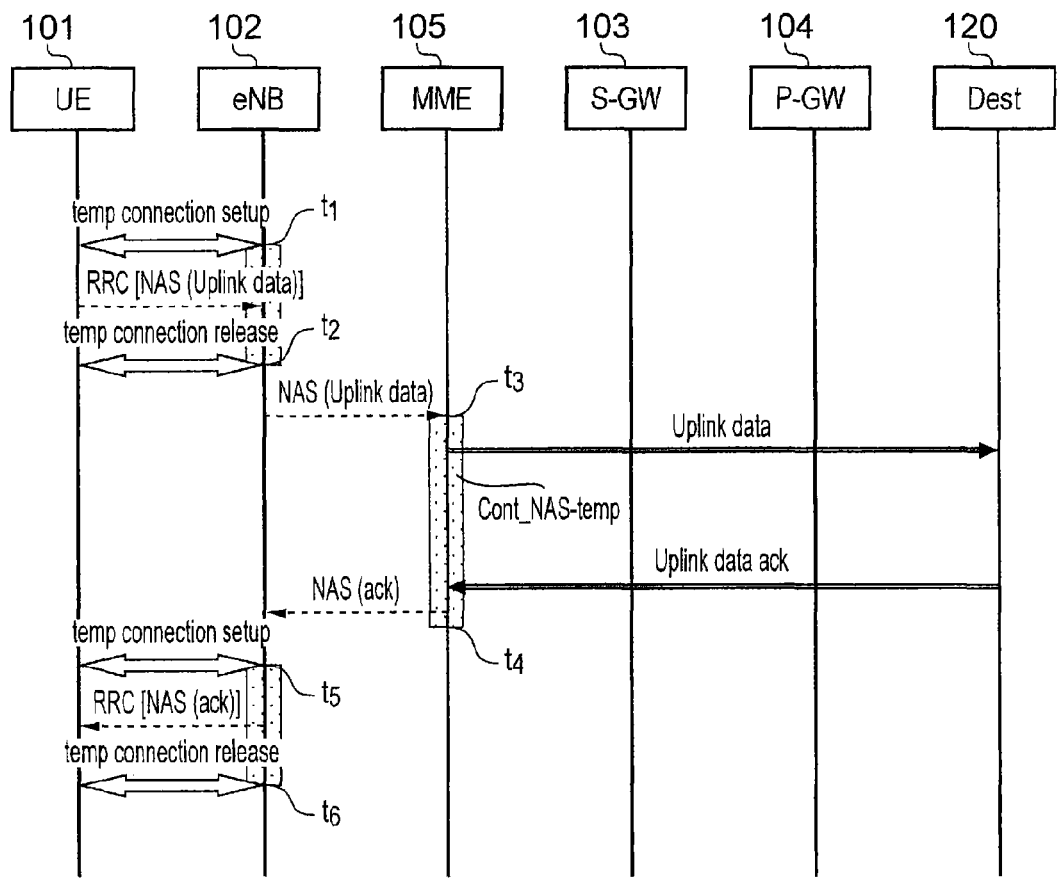
FIGS. 6 to 10 are schematic illustrations of a call flows associated with the communication of a short message.

The illustration of FIG. 6 shows an example where the terminal 101 sends the message when a temporary and reduced RRC connection is set up for a one-message conversation and where no NAS connection is pre-established.

In the example of FIG. 6, a temporary RRC connection is setup at $t_1$, where the RRC connection is not a conventional full RRC connection but is a connection that is (1) limited to a one-message conversation and (2) only configures the power settings. For example, Access Stratum (AS) security and mobility settings may not be configured even though it would normally be configured for a conventional transmission. As a result, the context to be maintained at the eNB can be reduced to contain only a reduced amount of information. For example, it may only comprise a terminal identifier and power settings. The RRC connection setup could rely on a new type of RRC message or on re-using existing RRC messages. For example, the terminal 101 could use an existing message and use a flag, field or indicator in the message to indicate that the RRC setup is not a conventional and complete RRC setup but is only a limited and/or temporary RRC setup. Alternatively, conventional RRC messages may be used at all stages where for example only the power settings parameters have been indicated in the messages.

The terminal then sends a NAS packet, i.e. a signalling packet, comprising uplink data for the destination 120, and sends this NAS packet to the MME 105, via a message to the eNB 102. In the example of FIG. 6, the NAS packet is carried in a RRC message, for example in a "RRC Uplink Information Transfer" message, however in other examples it may be carried in another type of RRC message or in a message for a different protocol. As the packet goes through the eNB 102, the eNB can release the RRC context at $t_2$ as this context was only setup for a one message conversation with the terminal 101. After receiving the message, the eNB 102 forwards the NAS packet to the MME 105 at $t_3$. In the illustration of FIG. 6, $t_3$ has been represented as being after $t_2$. However, the skilled person will understand that $t_3$ could also be before $t_2$ or at the same time as $t_2$. For example, the eNB 102 may first forward the NAS packet to the MME 105 first and then only release the RRC context. Even though this has not been illustrated in the Figures, the NAS packet sent by the eNB 102 to the MME 105 is generally sent in a S1-AP message. However, any other suitable protocol may be used for sending the NAS packet to the MME 105.

As the MME 105 receives the NAS packet, it will detect that it does not have any NAS context already set up with the terminal 101 and can then set up a temporary context Cont_NAS-temp. In the example of FIG. 6, the temporary context is set up for a two packet conversation with the terminal 101. The MME 105 then sends the uplink data to the destination 120. As the context Cont_NAS-temp has been set up for a two packet conversation, the MME 105 maintains the context even after the uplink data has been sent. In the example of FIG. 6, a successful transmission of the uplink data triggers an acknowledgement message in response. As generally the acknowledgement ("ack") message comes back via the same path as the uplink data, this ack message comes back to the MME 105. The MME then recognises that this message is associated with the terminal 101 and with the context Cont_NAS-temp and sends the ack packet to the terminal 101 via the eNB 102 using the context. After the MME 105 has sent the ack message, for example in a NAS packet, to the eNB 102 at time $t_4$, the MME 105 can delete the context Cont_NAS-temp as two packets have been exchanged and the context was setup for a two-packet conversation. In this example, the MME 105 sets up a temporary context for a two message conversation when it receives the NAS packet comprising the data for the destination 120. For the MME 105 to know that it should set up a two-packet conversation context, as opposed to for example no context, a one-packet conversation context, etc., various solutions may be used. In one example, the MME 105 can always set up a two-packet conversation context, i.e. the MME may not have any decision making capabilities in respect of the context. This may, for example, be well suited to an environment where only MTC short messages arrive at the MME 105 without any prior NAS connection setup and where it is known in advance that such messages are sent in a two-message conversation (e.g. message and acknowledgement). In another example, the MME may have some higher-layer(s) capabilities and may for example be arranged to identify the protocol above the NAS layer (or the relevant layer for terminal-MME direct communications), and/or to recognise some information in this higher layer protocol. For example, the MME may be able to detect whether the content of the NAS packet is transported in a short message protocol, and to detect whether the content of the NAS packet relates to a short message (e.g. first part of the conversation) or to an acknowledgement (e.g. second part of the conversation). In another example, the NAS packet may include a flag or an indication obtained from higher layer(s) (e.g. from a short messaging protocol layer) which indicates if and how a context should be set up. For example, to achieve the two-packet conversation context of FIG. 6, the NAS packet might include an indicator set to the value two to indicate that the MME 105 should expect a two packet NAS conversation.

As the NAS packet arrives from the MME 105 to the eNB 102, the eNB can then detect that it is not associated with any RRC connection or context for the terminal 101 and, at time $t_5$, it sets up a limited/temporary RRC connection for sending a message comprising the NAS packet, i.e. for a one-message conversation. In the example of FIG. 6, $t_4$ has been shown as being before $t_5$, however, in some examples, $t_5$ could in fact be before $t_4$. Once the temporary RRC context has been set up, the eNB 102 forwards the NAS packet comprising the ack message to the terminal 101. For example the NAS packet may be carried by a RRC message, or by a message of any other protocol lower than NAS.

Once the RRC message has been sent to the terminal 101, the eNB can then discard the temporary context at a time $t_6$ as the one message conversation has been completed. In the example of FIG. 6, the terminal does not have to set up a data path in the user plane for sending its message. Therefore a significant amount of signalling and set up can thereby be avoided. Also, the terminal can send the message before any conventional connection or context is set up at the eNB 102 and MME 105. In this particular example, the MME 105 does not have any context or connection set up for terminal 101 when it receives the message. Therefore the amount of signalling and of context can be reduced by being set-up as the message arrives, rather than prior to sending any message.

In the example of FIG. 6 where radio layer context information is stored in the eNB during a temporary radio connection, radio layer information may also be stored in the UE, this is not shown in the diagram. The UE may also store information of relevance to the NAS protocol such as security algorithm related information, this information may be stored during and between short message transfers, if any such information is required to be shared with the MME NAS protocol then this can be conveyed by the communications terminal to the MME along with the message carrying the application packet. Information stored in the MME context Cont_NAS-temp may also include information gathered from other sources than the communications terminal via the NAS protocol, for example it could include routing or security information gathered from the HSS.

As a result the complexity of sending a short message for an MTC terminal can be reduced and the efficiency of sending short messages can also therefore be improved. For example, the terminal can send a message according to FIG. 6 (or FIGS. 7-10) while it remains in the ECM_idle state, and the terminal can then communicate a short message to a remote destination even though a conventional terminal would have to set up RRC, NAS and EPS connections first and therefore would have to be in ECM_connected to send a message. Typically the terminal would have performed an ATTACH to the network and be in EMM_Registered state prior to conveying any short messages, which would avoid the necessity for an authentication process and NAS security establishment process with every packet transfer. However, the possibility that the terminal is also in EMM_unregistered state when sending a short message would also be a possibility, particularly where the frequency of short message exchange is very low or where simplified NAS security management processes are utilised. However, as the skilled person will recognise, some conventional mobile network features may be lost in sending a short message in this manner. For example, if the RRC connection comprises only power control and ARQ related contexts but does not include any mobility or AS security parameters or settings, the mobile network may be unable to provide any AS security or any mobility services to terminal 101. In that case, if the terminal 101 loses connectivity with eNB 102 (for example moves out of range of eNB 102), then no mechanism will be in place for the terminal 101 to handover to another base station while maintaining a continuity of services during and after the handover. As a result, the terminal 101 may not receive the ack message from the destination and it then cannot know whether the destination has received the short message. This may have to be managed by upper layer protocols (for example a messaging protocol) which may for example detect that the message should be re-sent because the terminal has not received any ack message in response to the first transmission. Therefore while such an approach may be well suited to MTC communications, it may be less suited to conventional mobile transmissions from a convention terminal.

Figure 7:
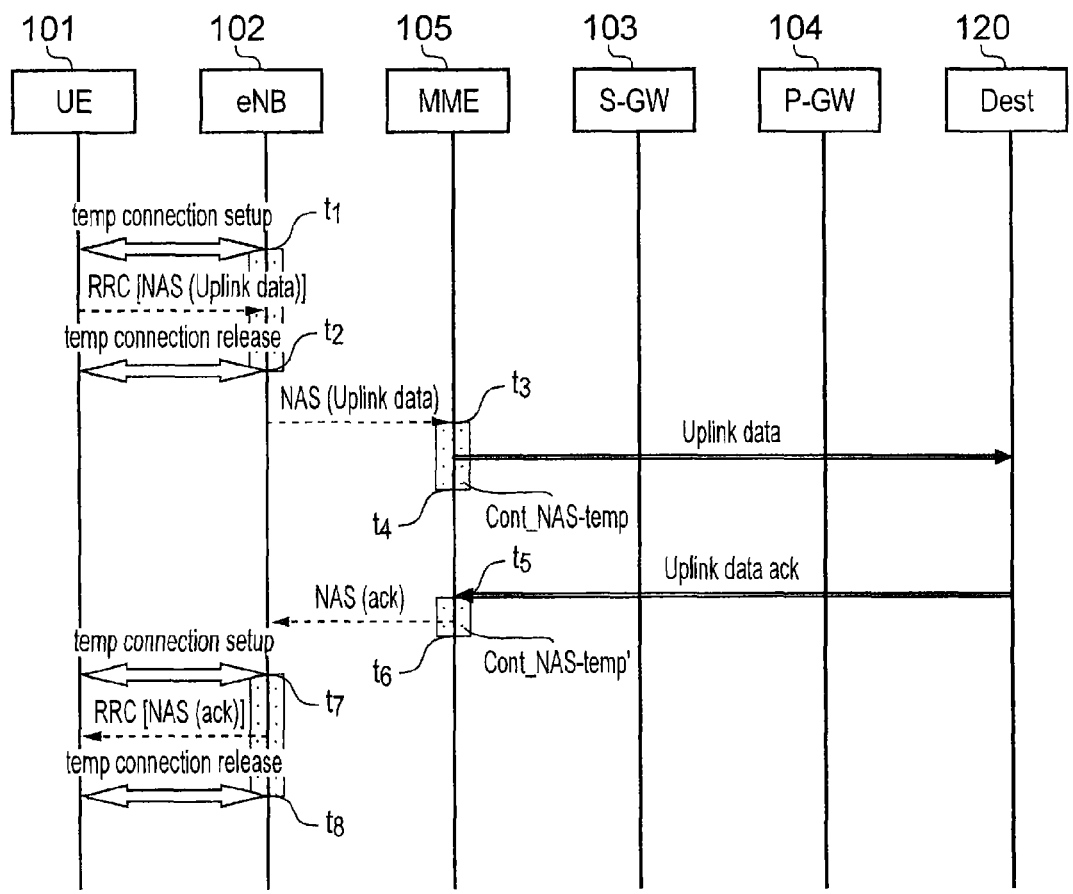

Another example is illustrated in FIG. 7. In this example, the MME 105 sets up a one-packet conversation context Cont_NAS-temp at time $t_3$, i.e. when it receives a NAS message from a terminal 101 and when this message is not associated with any pre-existing context at the MME 105. This behaviour from the MME 105 may for example be a default behaviour which may for example always be used, or may be used unless it is overwritten by a specific behaviour. For example a system may be configured to have the example of FIG. 7 as a default configuration and may use the example of FIG. 6 when the NAS message comprises an indicator that a two-packet conversation context should be set up.

At time $t_4$, i.e. when or after the uplink data has been transmitted to its destination, the MME discards the context Cont_NAS-temp as the packet of the one-packet conversation has already been received from the terminal 101 (via the eNB 102) and processed. Likewise, as the ack message arrives at the MME 105 from the destination 120 at time $t_5$, the MME 105 sets us a further temporary context Cont_NAS-temp' for sending the NAS packet comprising the ack message to the terminal 101 via the cNB 102. As this packet is sent to the eNB 102 for transmission to the terminal 101, the MME 105 can discard the context Cont_NAS-temp' at time $t_6$.

Figure 8:
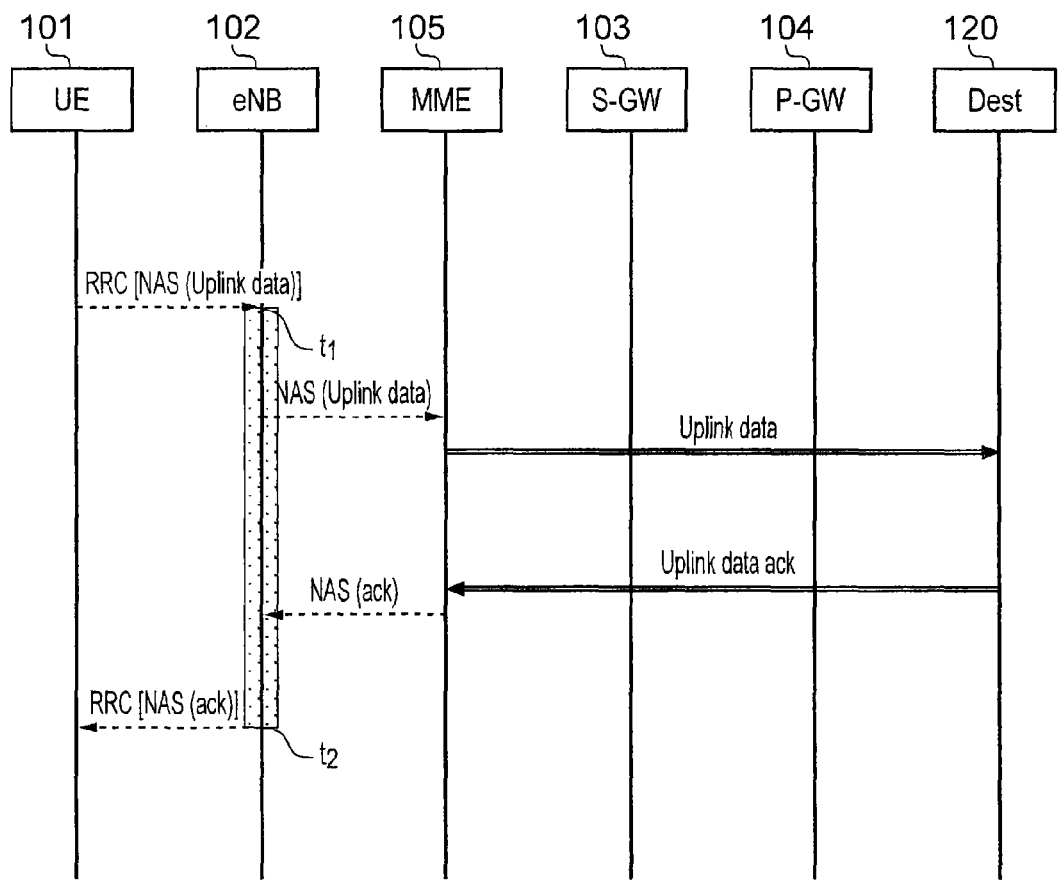

Then, as the eNB 102 receives the NAS packet, it sets up a temporary RRC connection with the terminal 101 for the purposes of sending the ack message, for example in an RRC message. This temporary RRC connection is also associated with the setup of a temporary RRC context at the eNB 102, which is therefore set up at $t_7$ and discarded at $t_8$. An example of where contextual information Cont_NAS-temp may be stored for a short period in the MME as shown in FIG. 7 might be where the MME needs to access information from another entity, such as accessing routing or security information stored in an HSS. A further example is illustrated in FIG. 8. In this example, the eNB sets up a temporary RRC context for a two-message conversation, but the eNB 102 sets up this context as the RRC message arrives, rather than after a temporary RRC connection set up as in FIGS. 6 and 7. To elaborate further, the temporary connection setup of FIG. 7 might include a period whereby channel soundings and channel sounding measurements are exchanged so that message transmissions can be made at the appropriate power settings and in the optimum time/frequency resources. In the case of FIG. 8 transmissions might be made using common channels, where there is no prior train up of power control loops and exchange of channel soundings. In the case of FIG. 7 the temporary connection release at the radio layer may be implicit, for example the temporary connection being released immediately that the radio layer ARQ ACK has been received. Also, in the example of FIG. 8, the MME does not set up any context and simply forwards the message to the destination. Likewise, as the ack message arrives back from the destination 120, the MME 105 simply forwards the ack message to the terminal 101 via the eNB 102. This can be achieved, for example, with a message that includes information that may usually be found in the context. For example any routing information that may be required for routing the ack message back to the terminal 101 may be included in the first message sent by the terminal, so that the destination can then send a message that is routable by the MME. One example is that the terminal may include its S-TMSI identifier in the message sent to the destination 120, the message might also include the address of the cell under which the UE is camped and the address of the destination. The destination 120 can then include some or all of this information in the ack message such that, as this ack message arrives at the MME 105, the MME is able to identify that this message is for the terminal 101 and can then route this ack message to the appropriate eNB and then the eNB is able to route the packet to the appropriate terminal 101 in the appropriate cell. 101. Because in this example the RRC temporary context is a two-message conversation context, as the ack message is sent by the eNB to the terminal 101 at time $t_2$, the eNB 102 can then delete the temporary context.

Figure 9:
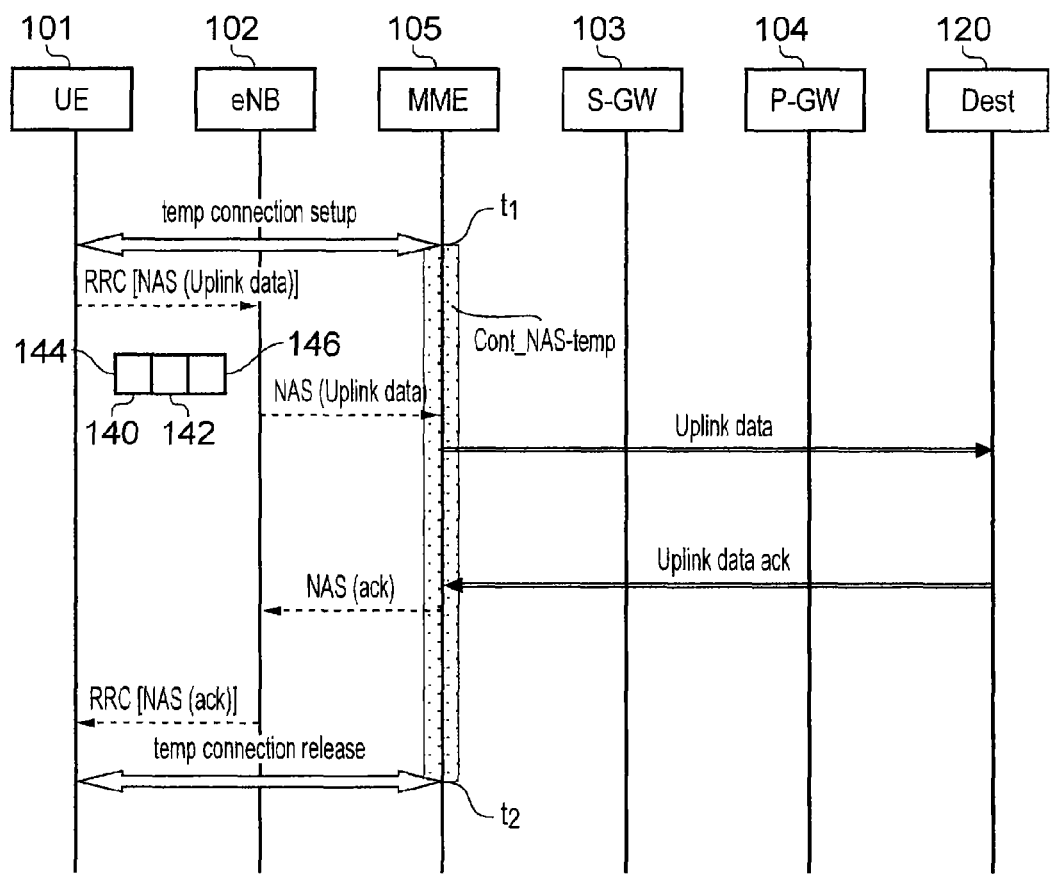

In a conventional system during the ATTACH procedure the MME could be loaded up with useful NAS security information. The NAS information could be stored for a predetermined time in the MME between ATTACH and DETTACH. As illustrated in FIG. 9 the NAS information could be established once the mobile terminal is switched on, which includes authentication and security which could be maintained indefinitely. In some examples, when communicating an RRC message 140, the communications terminal could establish a temporary context or context update for the communication of the RRC message 140. In FIG. 9, an example is provided in which the communications terminal 101 sets up a NAS connection with the MME 105. At time t1, the temporary NAS connection is set up and the MME creates a context Cont_NAS-temp including, for example, the NAS security parameters, which could be after the communications terminal is switched on. In that example, the context is set up for a two-packet conversation. However the context might be set up for a conversation of any number of messages of one or more.

Then the terminal 101 sends the RRC message 140 to the eNB. The eNB detects that the content of the RRC message should be forwarded to the MME 105. For example, the eNB 102 can identify that the RRC message is not associated with any existing connection with the terminal 101 and/or with any context for this terminal. In another example, the eNB 102 could be arranged to identify that the message 140 is not associated with any connection or context and to detect a flag or indicator 142 in the RRC message and would then set up a temporary context. In that particular example, the flag or indicator 142 could be used as a check for the eNB 102 to ensure that the message 140 is intended for the MME 105. In one example, the eNB 102 could then for example reject an incoming message 140 if it is not associated with any context and if it does not include the flag or indicator 142. The message 140 of course also includes data 144 which is being communicated to the destination device and may also include an indication of the TIMSI 146.

The eNB 102 then forwards the NAS packet to the MME, which then recognises that this NAS packet is associated with the context Cont_NAS-temp. The MME 105 then forwards the message to the destination 120.

As the MME 105 receives the ack message back from the destination 120, confirming that the destination has received the short message. The MME 105 recognises that the ack message is for the terminal 101 and is therefore associated with the context Cont_NAS-temp.

It sends the ack message to the terminal 101 in a NAS, which may itself be in a S1-AP message for sending it to the eNB 102. The eNB 102 then transfers the ack message to the terminal 101 in a message 140.

At time $t_2$, after the two-packet conversation between the MME 105 and the terminal 101 has been completed, the connection can be released and the temporary context Cont_NAS-temp can be discarded.

Figure 10:
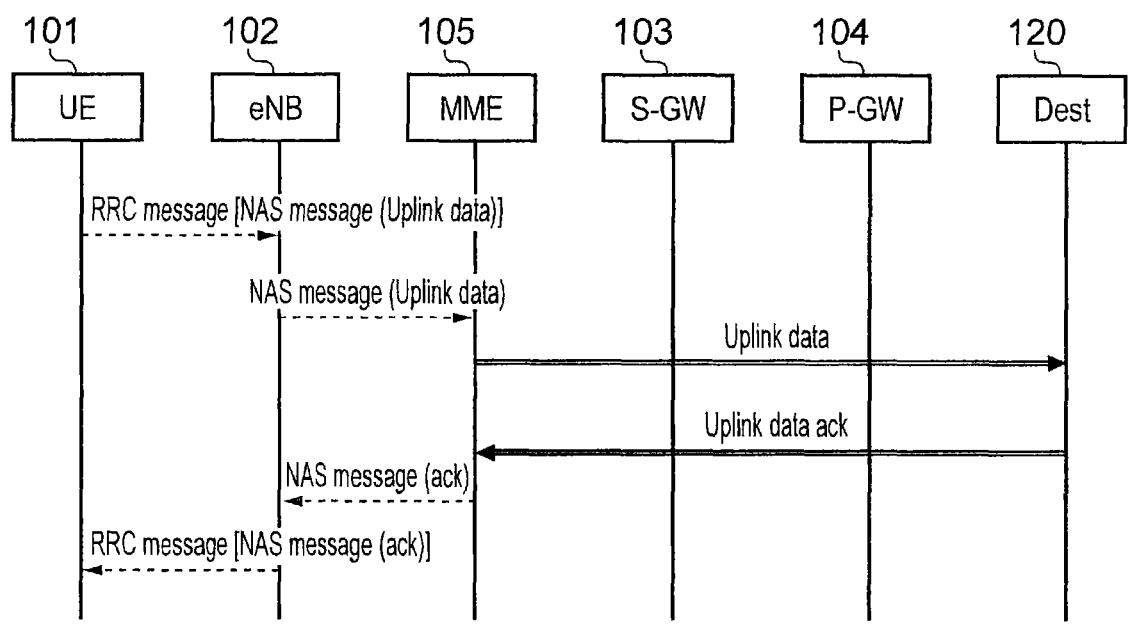

In the example of FIG. 10, the terminal 101 sends the short message while no context exists for this message in the eNB 102 or in the MME 105. Also the eNB 102 and the MME 105 do not set up any context, temporary or not, and they forward the message to the next node in a context-less manner. The ack message received in return is sent to the terminal 101 in a similar manner. In that particular example, the amount of signalling and of context to be maintained can be significantly reduced compared to sending a message in a conventional manner. Of course, some features or services may be lost in doing so, such as some security, mobility or session management features. Even though the loss of these features is likely to be considered as unacceptable for a conventional terminal, they may be acceptable for an MTC terminal at least because the transmissions are shorter, MTC terminals may be less likely to move and/or to change cell during a (brief) transmission and/or because MTC terminals are more delay-tolerant than other terminals (e.g. human-to-human communications terminals) and/or because a higher layer protocol such as that running between destination and UE may be able to re-instantiate or recover from failed short message transfers.

In the example of FIG. 10, as the RRC messages are sent when the eNB does not have any existing context for them, some features provided by a RRC connection establishment may not be provided. For example, the terminal 101 may not have any C-RNTI allocated as this identifier is generally allocated during a RRC connection establishment. Thus, the terminal may use and be addressed using the S-TMSI as the identifier. Other identifiers may also be used, for example the IMSI or MSISDN. Therefore for the example shown in FIG. 10, the allocation message used to specify the resources on which the RRC message can be transferred may include the S-TMSI or a proxy therefor.

In general, in FIG. 6-10, a situation has been illustrated where the temporary contexts (RRC or NAS) are discarded after a certain number of messages or packets of a conversation have been received and/or processed. The eNB 102 and MME 105 may also have timers for discarding the context. For example, in the example of FIG. 6, the MME 105 might have a timer $T_{cont-NAS}$ for maintaining the temporary context Cont_NAS-temp. For example, it may be desirable to discard the context at the timer's expiry even if the ack message has not been received. This may for instance be preferable in the event that the ack message is lost between the destination 120 and the MME 105 and thus never reaches the MME 105 or if the nature of operation of any destination server is such that the delay in receipt of the higher layer ACK by the MME may be long. If for example an ack message is generally received within 0.5 s, one might consider that if the ack message has not been received after 3 s, it has very probably been lost and is therefore unlikely to arrive at the MME 105 at all. In that case, one bound for the setting of the $T_{cont-NAS}$ timer might be 3 s. Alternatively, if the context includes routing information about the last known location of the UE then the timer might be set according to expectations about for how long the routing information is likely to be valid (and whether routing subsequent messages using that information is likely to be successful). This example and the values used in it is purely illustrative, the timer might have any value that is considered to be suitable to a particular situation and/or environment.

Example of Short Messages Infrastructure

In order to forward the message to the destination 120, adaptations to the infrastructure and/or protocols may be provided.

Figure 11:
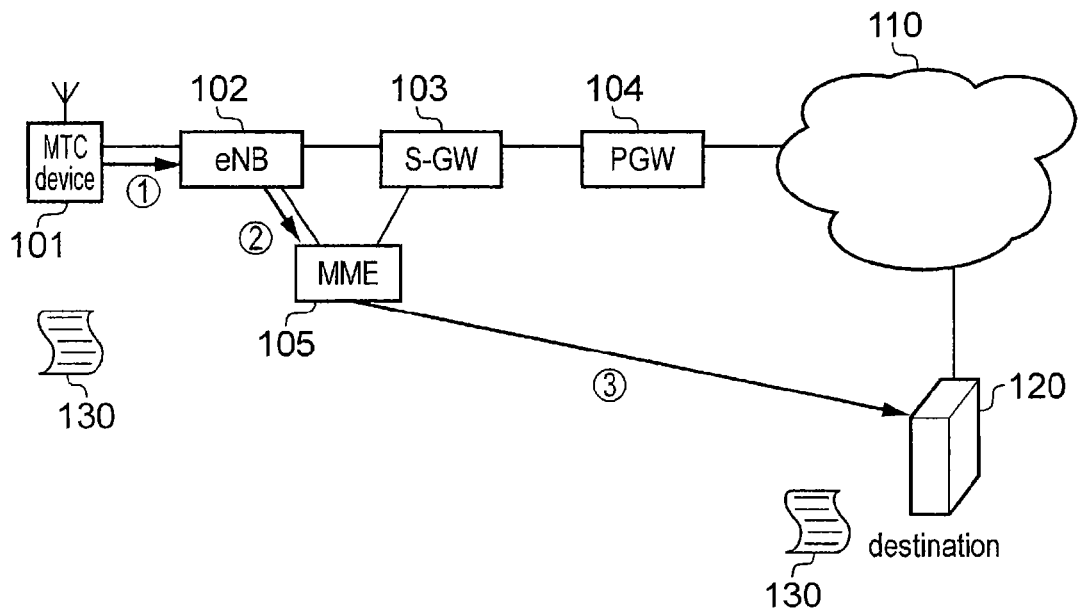
FIG. 11 is an illustration of a possible path for sending a short message.

FIG. 11 is a schematic illustration of a mobile terminal, in that example MTC terminal 101, sending a message 130 to the destination 120 via the MME 105. At first (step 1), the message is sent by the terminal 101 to the eNB 102, the message being carried in a signalling message (e.g. NAS message encapsulated in an RRC message). Sending this message does not require or trigger the set-up of a data path as would normally be expected in PS networks when sending user data, and (step 2) the eNB, upon reception and identification of the signalling message, forwards the message 130 to the MME 105 in a signalling message. The MME 105 then sends the message 130 to the destination 120 at step 3. This illustration is a schematic illustration of a mobile-originated sending of a short message, it does not for example illustrate the specific connection between the MME 105 and the destination 120. This connection may for example be a direct connection or indirect, going via the Internet or via another route.

Figure 12:
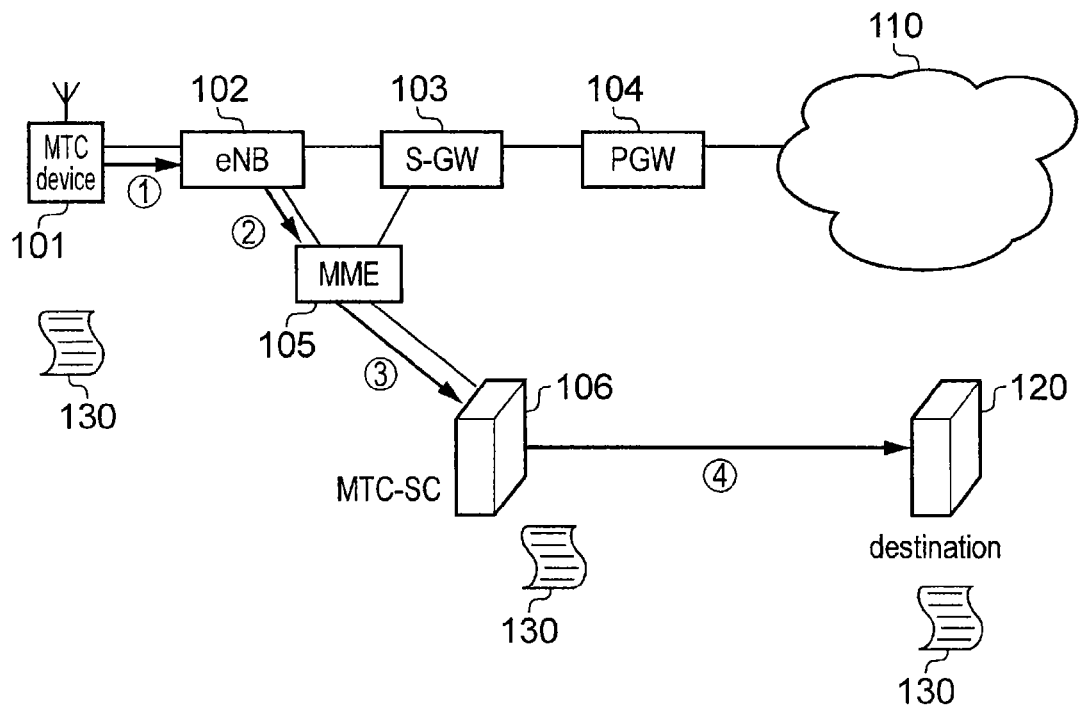
FIG. 12 is another illustration of a possible path for sending a short message.

FIG. 12 is an illustration where the connection is indirect and is via a messaging server 106. For the purposes of illustration, the messaging server will be called "MTC-SC" for "MTC Service Centre". As illustrated in FIG. 12, the MME 105 detects that the signalling packet carrying the message 130 is a short message to be forwarded to MTC-SC 106. This detection could be carried out in different ways, for example and as discussed above, the MME 105 could detect the type of message carried in the NAS packet, or the NAS packet may comprise an indicator that this NAS packet actually carries a short message for forwarding to MTC-SC 106. Finally, MTC-SC 106 can transmit the message 130 to its destination 120. This transmission can also be performed in any other appropriate manner. For example, it can be transmitted directly to the destination, or via a further messaging server and/or a router.

Although this MTC-SC 106 has been represented in FIG. 12 as separate from the MME, the skilled person would understand that the separation in the illustration is only logical and for the ease of representation and understanding, and that the MTC-SC may for example physically form part of the MME. In another example, the MTC-SC may be a separate server, for example a standalone server.

Advantageously, this MTC-SC 106 can be used for advanced functionalities such as store and forward. For example, the server can store an incoming mobile terminated message if the terminal 101 is not attached to the network yet and sends this message as soon as it attaches to the network. Likewise, if the terminal 101 sends a message to another party that cannot be reached, the messaging server MTC-SC 106 can store the message and forward it when this other party becomes available.

Figure 13:
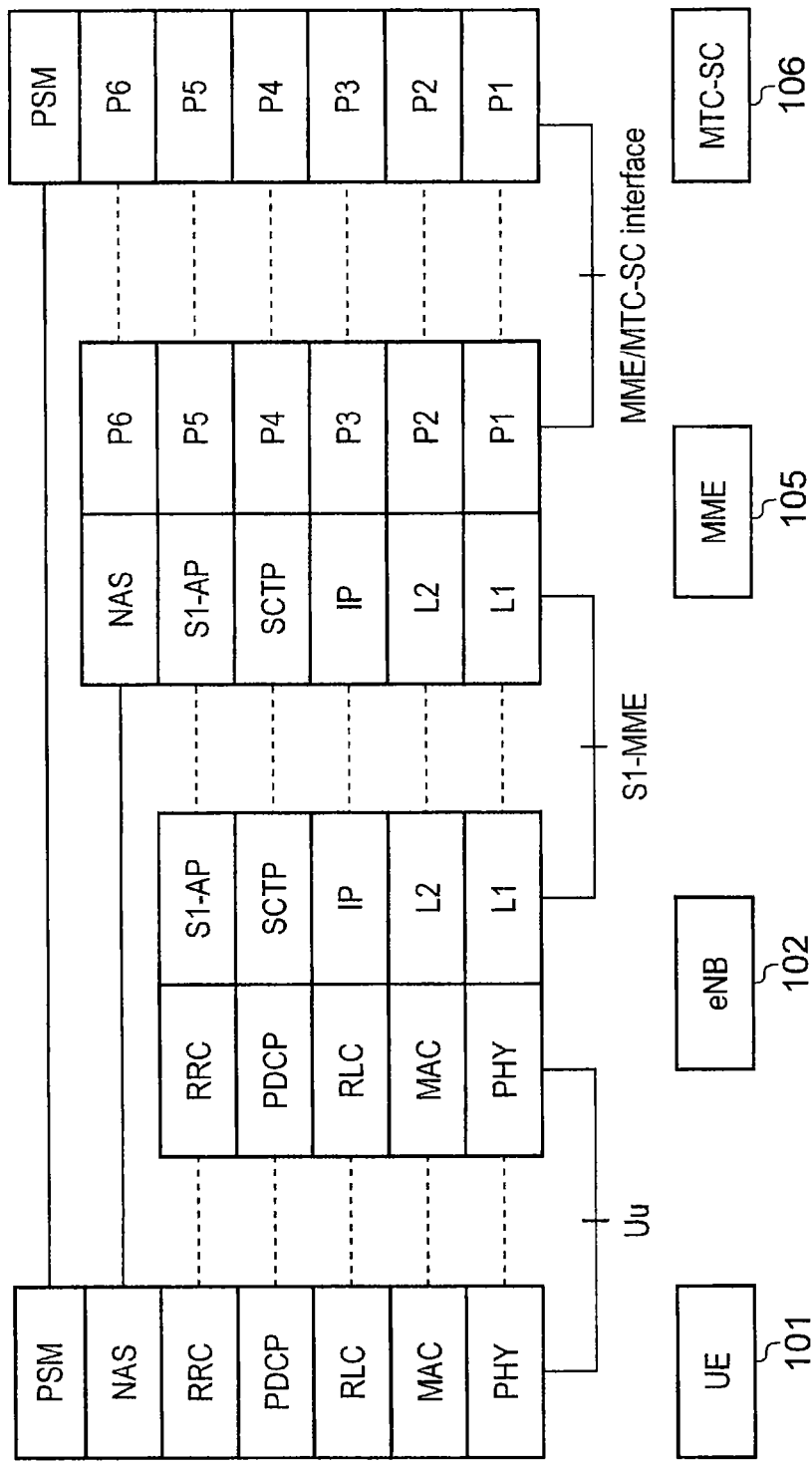
FIG. 13 is an illustration of a possible protocol stack for sending short messages.
Figure 14:
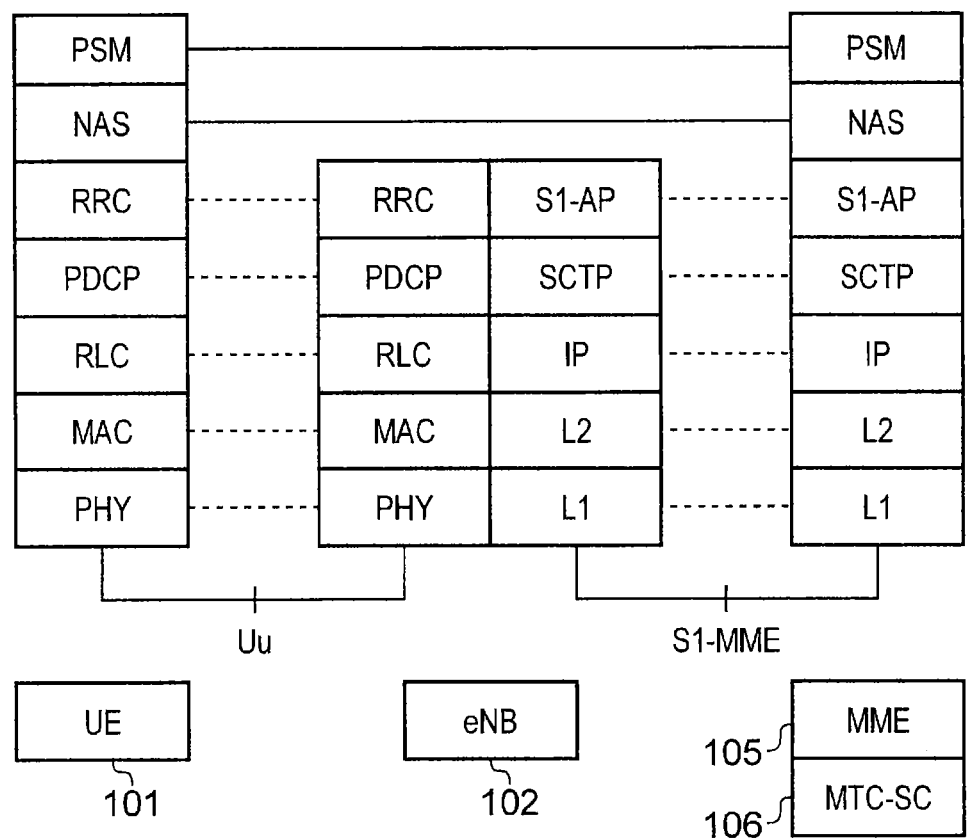
FIG. 14 is an illustration of another possible protocol stack for sending short messages.

FIGS. 13 and 14 illustrate two possible protocol stacks arrangement that may be suitable for an arrangement according to for example FIG. 11 or FIG. 12. In FIG. 13, the MME can act as a relay for messages between the terminal (or UE) and the MTC-SC and, in this example, the short messages are carried by a protocol called "Protocol for short messaging" (PSM). This name does not refer to any particular specific protocol and is used for illustrative purposes: PSM may be any existing, modified or new protocol suitable for sending the message to the MTC-SC. In FIG. 13, protocols from LTE have been used for illustrative purposes and the skilled person will understand that the invention could also be carried with a different set of protocols. Because in LTE the terminal communicates directly with the MME using a "NAS" protocol, the short message may be carried by a NAS packet so that the short message can be sent to the destination 120 and/or MTC-SC 106 via the MME 105 (via the eNB 102). The MME can then forward the upper layer (relative to the NAS layer) information to the MTC-SC. In the example of FIG. 13, the protocols used between the MME and the MTC-SC have not been specified and have simply been referred to as P1-P6. In effect any suitable protocol and suitable number of protocols (it could for example be more or less than six protocols) for an interface between the MME and the MTC-SC may be used. For example, the stack may include five main layers such as Ethernet; MAC; IPsec; SCTP; and MTC-AP where MTC-AP is a protocol for MTC applications (standing for example for "MTC Application Protocol").

With such a protocol stack, a short message 130 can be sent by the terminal 101 in a PSM message, the message itself being sent in a NAS packet, and the packet being sent in a RRC message to the eNB 102. The eNB 102 then forwards the NAS packet in a S1-AP message to the MME 105. After receiving the NAS packet, the MME 105 can then forward the PSM message comprising (the short message 130) to the MTC-SC for transmission to the destination 120. In the event that the terminal receives a short message and has to return an ack message to confirm that the short message was successfully received, the ack message can follow the same path as the mobile-originated short message 130 discussed above. Any PSM message for the terminal 101 (mobile-terminated message) may follow the same path in the other direction as a mobile originated short message. Such a mobile terminated message may for example be a mobile-terminated short message (e.g. the terminal 101 receives a short message) or an ack message in response to a mobile-originated short message.

The example of FIG. 14 illustrates another protocol stack arrangement which may be suitable for an MME that includes short messaging capabilities. In that case, the MME may for example process the actual short message 130. It may also not actually process the short message 130 but may for example have PSM-relay capabilities that require that the MME implements some PSM functionalities.

Some might consider that including PSM capabilities in the MME 105 may not be preferable as the MME was originally designed to perform only as a signalling node, while other might consider that it might simplify the global architecture to have PSM capabilities in the MME 105. The skilled person will be able to identify which arrangement would be preferred in a specific situation, depending on its specific requirements.

Reduced Mobility Management for MTC Terminals

According to an aspect of the present invention a mobile communications network is configured to provide a reduced mobility functionality to reflect a reduction in a capability of a mobile terminal which might for example be used for MTC type applications. The following description and figures provides an explanation of the reduced mobility functionality in accordance with the present technique.

Embodiments of the present technique can provide a reduced mobility functionality to some mobile terminals, such as those which might be operating as MTC type terminals. Examples illustrating the reduced mobility functionality are explained as follows with reference to FIGS. 15 to 25.

Figure 15:
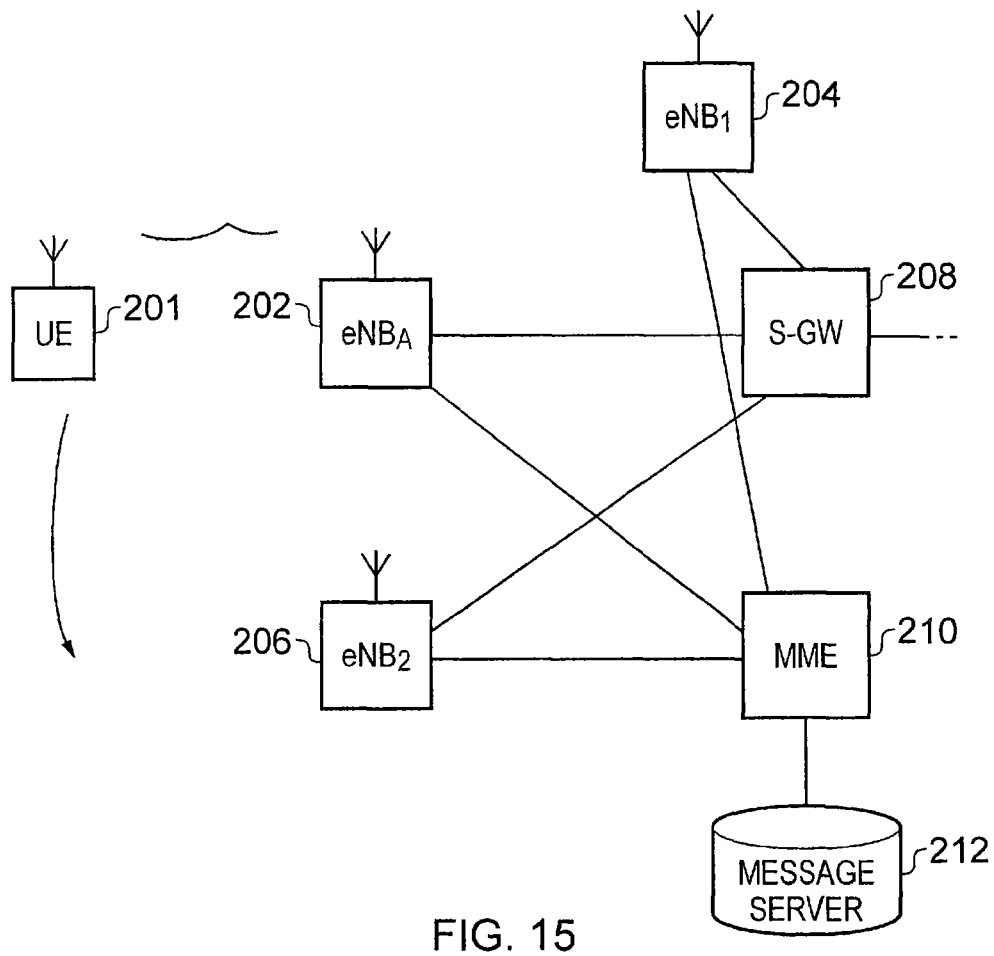
FIG. 15 is a schematic block diagram of a parts of a mobile communications network according to the LTE standard shown in FIGS. 1 and 2 illustrating a change of affiliation of a mobile communications terminal from one base station to another.

FIG. 15 provides a schematic block diagram of parts of a mobile communications network which are provided to illustrate the reduced mobility functionality in accordance with the present technique. The parts of the mobile communications network are illustrative of an example of an LTE network as for example illustrated in FIGS. 1 and 2. In FIG. 15 a mobile terminal 201 communicates a message datagram to or from a source or an anchor base station (eNB) 202. The anchor eNB 202 forms part of a cluster of eNB's 204, 206 which serve to provide a facility for communicating data to or from mobile terminals 201 via a wireless access interface provided by each of the eNB's 202, 204, 206. In accordance with a conventional operation the eNB's 202, 204, 206 are connected to a serving gateway (SG) 208 as for example shown in FIG. 1. Also connected to the eNB's 202, 204, 206 is a mobility management entity (MME) 210. Of particular relevance to the present explanation is a message server 212 which is connected to the MME 210. In one example the message server 212 is an MTC-SC referred to in the above explanations.

According to the present technique and in relation to the context-less communication explained above, the MME 210 is arranged to provide a reduced mobility function in connection with the communication of messages to or from the mobile terminal 201. To this end, the MME 210 is arranged to store a current location of a mobile terminal 201 until either all outstanding message transfers have occurred or an "routing information freshness timer" has expired. If either of these conditions is met then the routing contexts for the mobile terminal in the MME are removed. According to one aspect the mobility management functionality for MTC terminals will then have to establish a location of the communications terminal when this has changed attachment from one base station to a second base station. Thus the mobility management solution as proposed in accordance with the present technique can be applied to one or both of the following messaging scenarios:

NAS signalling message exchange in which most NAS messaging exchanges consist of multiple messages exchange between a mobile terminal and an MME 210. These message exchanges should typically be completed in a short period of time.

Short message exchange, short messages are transferred in a NAS container in which the short message exchanges are expected to consist of two steps that is a transfer of the message from the originator entity (eg MTC-SC) followed by an acknowledgement from the recipient entity, for example the mobile communication terminal 201.

As an illustration of a reduced mobility management functionality, FIG. 15 illustrates that the mobile terminal 201 which is currently attached to an eNB 202 changes affiliation to a second eNB 206. In the following description the first eNB 202 will be referred to as the anchor eNB whereas the second eNB 206 will be referred to as the second eNB or the target eNB. The present technique therefore addresses a technical problem of how to deliver a message to the mobile terminal 201 when the mobile terminal 201 has changed affiliation from one base station to another.

Conventionally, the communication of data messages or datagrams to or from a mobile terminal which changes its affiliation from one base station to another is handled using handover procedures in which the network directs the mobile terminal to change affiliation in response to link quality measurements reported by the mobile terminal. The mobile communications network then arranges to communicate data from a new target base station or eNB 206 and stops communicating from the source or first base station 202. However the present technique provides a simplification for mobility management which does not include a full handover procedure which typically requires a significant amount of signalling to configure measurements, send measurement reports, prepare target base station, command handover, reconfigure tunnels and release resources from the source base station. As explained above, if the amount of data communicated to or from the mobile terminal 201 is relatively small then the amount of signalling overhead required to deliver this message would represent a very inefficient use of radio communications resources. According to the present technique therefore it is envisaged that a mobile communication terminal which for example may be operating as an MTC type terminal is provided with a reduced mobility functionality which may be reflected in a new connection state which will be explained below. However the following paragraphs serve to provide an illustration of an example of the present technique in providing a reduced mobility management function.

Figure 16:
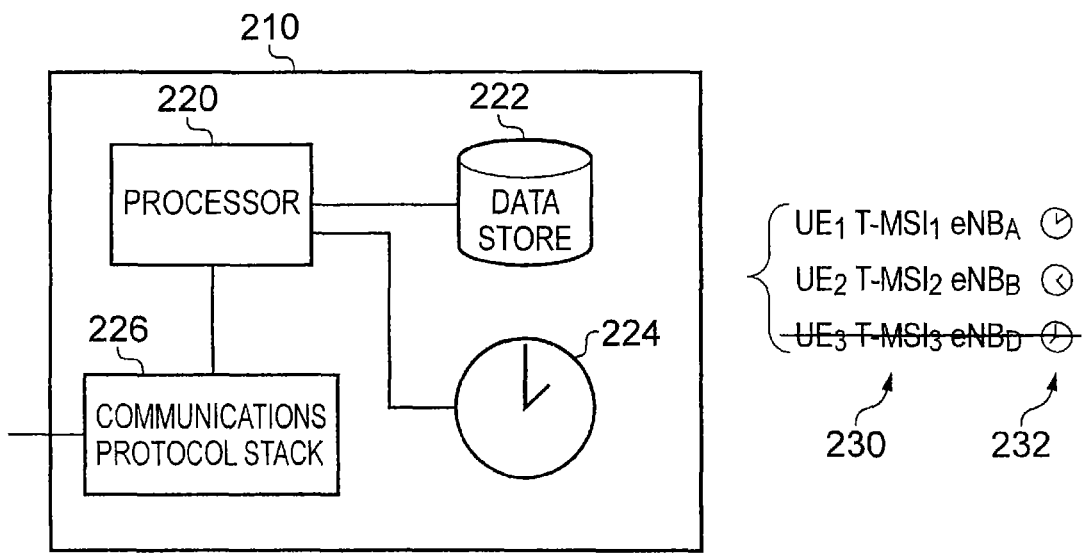
FIG. 16 is schematic block diagram of a mobility manager shown in FIG. 15.

FIG. 16 provides a more detailed view of the MME 210. In FIG. 16 a processor 220 is arranged to control the operation of the MME and includes a data store 222. The processor also receives an input from a clock 224. The processor is connected to a communications protocol stack 226 which serves to implement the various levels of the communications protocol stack which are performed by the MME 210.

In accordance with the present technique the MME 210 is arranged to store a current location of each of the mobile terminals for which it is responsible within a tracking area served by the MME. However the location of each of the mobile terminals in respect of a base station (eNB) to which they are currently attached is stored in the data store 222 by the processor 220 only for a predetermined period. The eNB to which the mobile terminal is attached is maintained until all outstanding message transfers to a mobile terminal have been completed or until a "routing information freshness timer" as determined by the clock 224 has expired. At this time the eNB location of the mobile terminal is deleted from the data store 222. Thus as shown in FIG. 16 a list 230 of mobile terminals within a tracking area served by the MME is stored in a table with the mobile terminal's S-TMST and an identifier of the base station eNB-A to which the mobile terminal is attached. In addition a clock value indicating a time at which the location of the mobile terminal was registered 232 is provided within the table. Thus as mentioned above once the mobile terminal has been attached to an eNB for a predetermined amount of time then the entry in the data store of the current location of the mobile communication terminal is cancelled. In FIG. 16 this is illustrated with respect to the mobile terminal identified as UE3.

According to the present technique there is provided a reduced mobility functionality to a mobile terminal which might find application in particular with MTC type mobile terminals which are simplified with respect to conventional mobile terminals. Accordingly with the present technique full handover may not be supported. Thus if a mobile terminal wishes to transfer a message to a destination via the mobile communications network or receive a message from the mobile communications network as for example a NAS signalling message or a short message exchange, then handover is not supported. To this end, the mobile terminal may include a further communications state referred to in the description below as a "radio resource communication (RRC) messaging connected" state. In this state the mobile communications network does not support full handover and therefore does not direct the mobile terminal to reattach to a new base station for continuing a communications session. Accordingly if the mobile terminal detaches from a first or source base station and attaches to a second or target base station then in accordance with the present technique the message which is to be communicated to the mobile terminal is simply lost. Higher layer protocols can then arrange for the message to be resent to the mobile terminal. To this end, the mobile terminal determines that it should reselect to a target base station and reselects to that base station. The network may be adapted to determine a location of the mobile terminal in order to communicate the message. Examples of detecting that the mobile terminal has reselected to a new target base station and determining an identification of the target base station will be explained in the following paragraphs.

Figure 17:
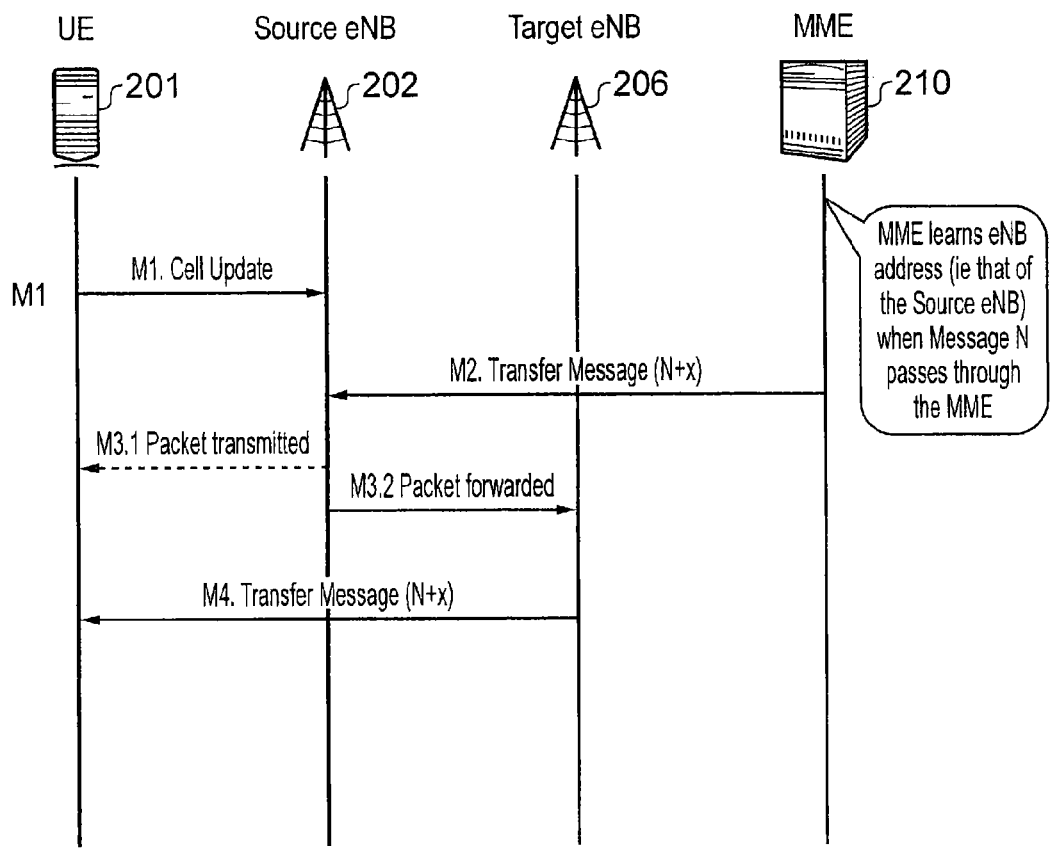
FIG. 17 is an illustrative representation of a call flow process for delivering a down link data packet according to one example of the present technique.

In FIG. 17 a message flow diagram is presented for operation of an MME 210 in arranging for a message to be communicated to a mobile terminal 201 when the terminal 201 has moved on from a source base station 202 and reselected to a target base station 206.

As shown in FIG. 17 and reflecting the situation shown in FIG. 15, after the mobile terminal 201 has detached from the first or source base station 202 and reselected the second or target base station 206 the mobile terminal 201 sends a first message M1 to provide a cell update to the source base station 202 to indicate that it will be changing affiliation to the target base station 206. The MME 210 has previously communicated a message N from the mobile terminal 201 to the destination and therefore assumes that the mobile terminal 201 is still attached to the source base station. Accordingly the MME 210 has in its data store a location of the mobile terminal 201 which is that of the source base station 202. Accordingly when the MME 210 has a message N+x to communicate to the mobile terminal 201 the MME 210 communicates using a message M2 the data packet for communication to the mobile communication terminal 201. However as illustrated in FIG. 17 the MME 210 communicates the data packet to the source base station or eNB 202.

In message M3 when the source base station 202 attempts to communicate the packet to the mobile terminal 201, that communication fails. However since in message M1 the mobile terminal 201 communicated the cell update to the source base station 202 indicating that it had reselected to the target base station 206, the source base station 202 in message M3.2 communicates the data packet to the target base station 206. Accordingly the target base station 206 communicates the data packet to the mobile terminal in message M4.

Figure 18:
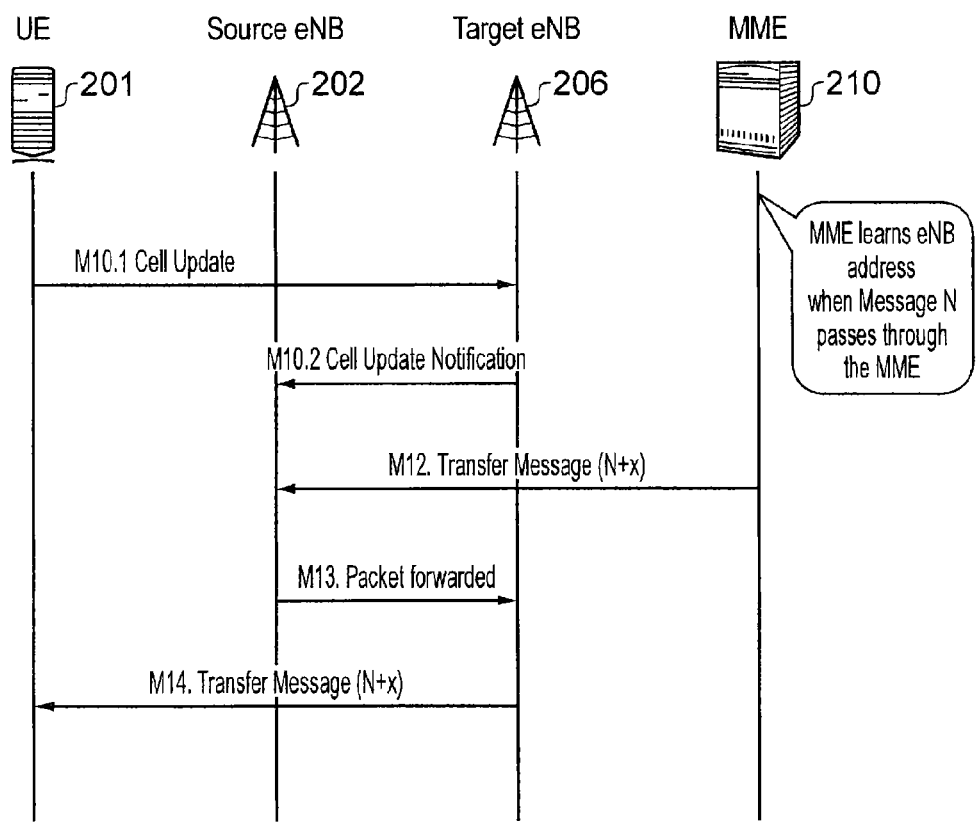
FIG. 18 is an illustrative representation of a call flow process for delivering a down link data packet according to another example of the present technique.
Figure 19:
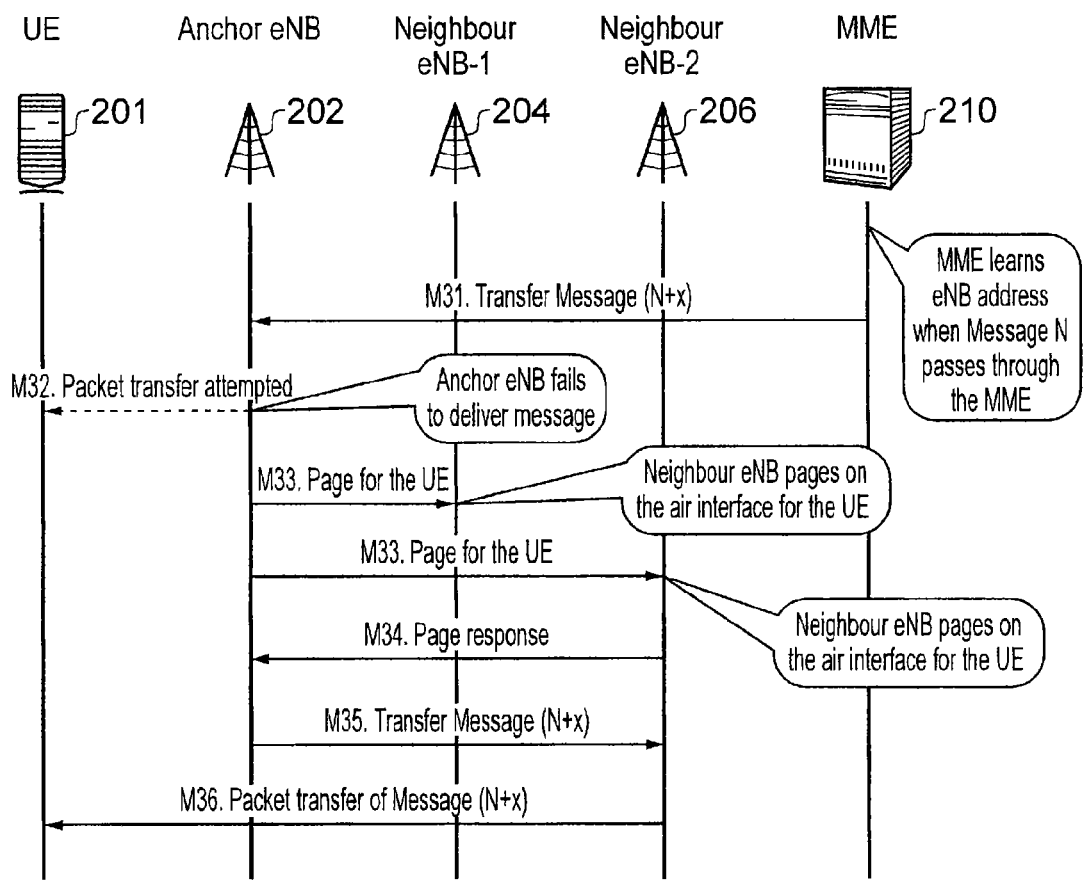
FIG. 19 is an illustrative representation of a call flow process for delivering a down link data packet according to a further example of the present technique.

In FIG. 18 a similar arrangement is shown to that represented in FIG. 17 except that the mobile terminal communicates its cell update through the target eNB 206. Thus as shown in FIG. 18 a mobile terminal 201 sends a message M10.1 which includes a cell update to the target base station 206 which advises the target eNB that the mobile terminal is currently attached to the target base station 206. The target base station 206 sends a message M10.2 to inform the source base station 202 of an update of the mobile terminals' location by informing the source station 202 that the mobile communication terminal 201 is attached to the target base station 206. In message M12 the MME communicates a data packet N+x to the source base station 202 because, as with the case shown in FIG. 17, the MME last communicated a message N from the source base station 202 to the destination and therefore assumes that the mobile terminal is attached to the source base station. However since the source base station 202 has been informed by the target base station 206 that the mobile terminal is attached to the target base station 206, the source base station 202 forwards the data packet to the target base station 206. Accordingly the target base station 206 then communicates the data packet as the message N+X in a message M14 to the mobile terminal.

In accordance with a further aspect of the present technique the MME may have the previous location of the mobile terminal as attached to the anchor base station 202.

Accordingly with a message M31 the MME communicates a data packet providing a message N+x to the anchor base station or eNB 202 for communication to the mobile terminal. As shown in message M32 the anchor base station 202 attempts to communicate the message to the mobile terminal 201. However the message delivery fails. This is because the mobile terminal has now reselected itself onto the target or second base station 206. Accordingly, the anchor base station triggers paging messages to be transmitted to its neighbouring base stations 204, 206 in order to page the mobile terminal. The base stations which are paged are provided from the anchor base station 202 in a list which is to be used in case that the message M32 cannot be delivered to mobile terminal in which case it is assumed that the mobile terminal has changed its location. This list may contain the same set of cells/eNBs as are in the neighbour list which an eNodeB may anyway store for the purposes of handover control or improving cell reselection performance. Accordingly, as shown in messages M33 the source or anchor eNB 202 communicates a message to the neighbouring base stations 204, 206 to trigger a paging message to be transmitted from those base stations. Since the mobile terminal 201 is attached to the second base station 206, the second base station 206 detects that the mobile terminal 201 is currently attached to it and responds to the paging trigger message M33 with a message M34 informing the anchor eNB 201 that the mobile terminal is currently attached to it. The anchor base station 202 therefore transfers the packet in a transfer message M35 to the second base station 206 which the second base station 206 then communicates to the mobile terminal 201 in a transfer message M36. Accordingly the data packet providing message N+X is communicated to a mobile terminal from the second base station 206.

In another example the mobility manager 210 is configured to request from at least one of the mobile communications terminal or the eNB 206 information providing an update of the second base station which the mobile communications terminal has reselected. The information could be provided by the communications terminal in an RRC message, which is communicated by the communications terminal via the eNB as a non access stratum message. Thus in one example, the cell update information is provided in a way which is substantially transparent to the eNB. If the eNB does not know the content of the NAS message is, it just forwards it to the MME.

The alternative is that the communications terminal can provide a cell update to the eNB (which may then use the information) as per for example FIG. 17 or 18), but in which case additionally the eNB also forwards the cell update to the MME.

In another example the first base station may send the paging message to one or more base stations in a list of neighbouring base stations, which may be provided to base stations in a 'neighbour list'. The 'neighbour list' may be OMC configured or an eNB learnt list of surrounding base stations which communications terminals may hand over or hand off to. This list is conventionally already available in base stations and is conventionally used for configuring handover measurement reporting, identifying local cells to aid cell reselection.

New RRC Messaging Connected State

Figure 20:
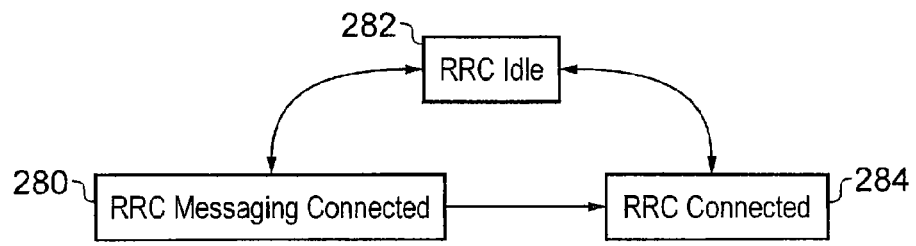
FIGS. 20 to 23 provide illustrative arrangements of states which a mobile communications terminal can adopt when operating in accordance with the present technique.

As mentioned above, in accordance with the present technique the mobile terminal 201 and the base station to which the mobile terminal is attached 206 can form a new state referred to as an RRC messaging connected state which is shown in FIG. 20. In FIG. 20 an RRC messaging connected state 280 is shown to be one of three states which include an RRC idle state 282 and an RRC connected state 284. The RRC idle state 282 and the RRC connected state 284 are conventional states of the mobile terminal and the base stations which transition between these states in response to whether the mobile terminal is currently provided with a communications bearer for communicating data or not. Thus when in the idle state 282 the communication to or from the mobile terminal is not possible and the eNB is unaware that the UE is camped on it. However in the RRC connected state 284 the mobile terminal is attached to the mobile communications network and is provided with radio communications resources for communicating data.

Figure 21:
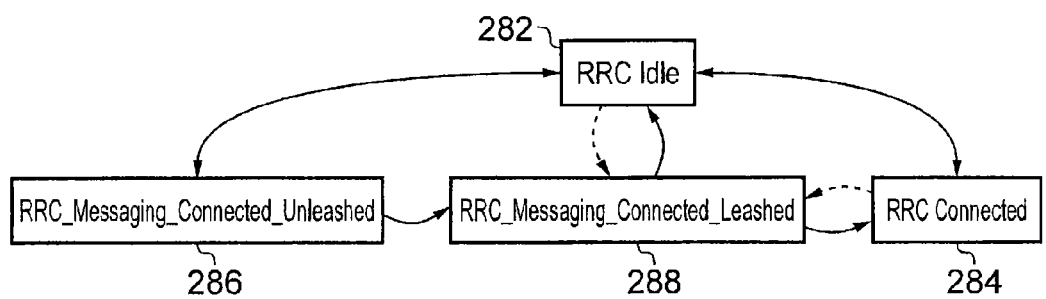

According to the present technique the mobile terminal 201 and the base station 206 to which it is attached form a new RRC messaging connected state in which only messaging is supported and no user plane can be provided, reduced radio functionality sufficient and optimised for a messaging only application is provided for communication to/from the mobile terminal. Furthermore within the RRC messaging connected state 280 there are two sub states referred to as the RRC messaging connected unleashed state and the RRC messaging connected leashed state 286, 288 which are showing in FIG. 21. In the leashed state the mobile terminal is required to update the RAN about changes in the location of the terminal so that the RAN can route downlink packets to the correct base station to which the terminal is attached. In contrast in the unleashed state the mobile terminal and the base station are not required to update the RAN about changes in the location of the mobile terminal. The leashed state may be supported using conventional network controlled handover. Alternatively the state may be supported using UE controlled cell reselection, which may be augmented with other mobility techniques as have already been described such as UE provided cell update to source or target eNB or anchor eNB triggered paging to find the UEs new location. The states of the state diagram of the mobile terminal shown in FIG. 21 are summarised as follows:

State Descriptions:

RRC_Idle
- mobile terminal is unknown to the RAN. No contexts associated with that mobile terminal exist in the RAN
- No data transfer or signalling transfer is possible in idle mode (except as part of transitioning to another state)

RRC_Connected
- mobile terminal is known to RAN, contexts exist within the RAN for that mobile terminal
- Access Stratum security is set up
- SRB1, SRB2 and DRB available
- C-RNTI assigned
- Handover based mobility management
- Transfer of any NAS signalling, short messages or data over an IP connection is possible in this state RRC_Messaging_Connected_Unleashed
- Transfer of short messages and optionally NAS signalling possible No SRB2, DRB or AS security is available
Preferentially, contexts will be established/deleted in the RAN implicitly as part of the message transfer transaction (not using separate a priori, a posteriori RRC signalling)
Unleashed: cell reselection mobility provided, UE does not provide notification to network of cell change. This may imply reliance on higher layers such as NAS or PSM to recover from any packet loss that occurs as a result.
No signalling based S1 tunnel re-arrangement.
Optionally mobile terminal listens to and utilises RAN stack optimised for messaging and/or MTC, which may include simplified PHY, MAC, RLC.

RRC_Messaging_Connected_Leashed
Only transfer of short messages and optionally NAS signalling possible
Leashed: mobile terminal/eNB required to update RAN about changes in mobile terminal location, so that RAN can route downlink packets to the correct eNB.
May use network controlled handover based mobility management:
This means that mobile terminal location is tracked as the mobile terminal moves from cell to cell, handover measurements will be configured, packet forwarding on handover may be supported, eNB may notify MME of cell change.
Instead of handover source eNB may act as an anchor and either the UE directly or indirectly provides the anchor eNB with information about cell change or the anchor eNB pages local cells to discover the UE's new location.
No DRB or AS security is available
Optionally mobile terminal listens to and utilises RAN stack optimised for messaging and/or MTC Transitions:
RRC_Idle to RRCMessaging_Connected_Unleashed
Trigger: Short message (or possibly NAS signalling) to be sent either on uplink or downlink
Realized by: Signalling prior to data transfer or preferentially implicitly as part of packet transmission
RRC_Messaging_Connected_Unleashed to RRC_Idle
Trigger: One way short message transfer is completed or multi-step message conversation is completed or inactivity timer expires
Realized by: Signalling or implicitly by removal of contexts after message transfer(s) are completed or after inactivity timer expires
RRC_Messaging_Connected_Unleashed to RRC_Messaging_Connected_Leashed
Trigger: Frequency of messaging exceeds threshold and/or number of cell changes per unit time exceeds threshold
Realized by: Signalling
RRC_Messaging_Connected_Leashed to RRCMessaging_Connected_Unleashed
Support for this transition is not critical and is shown as not supported in the diagram. If activity in RRC_Messaging_Connected_Leashed drops below a threshold then a transition to RRC_Idle should be enacted. However, optionally the transition could be supported if frequency of messaging drops below a threshold and/or number of cell changes per unit time drops below a threshold.
RRC_Messaging_Connected_Unleashed to RRC_Connected
Trigger: This transition could be triggered by the need to set up an IP pipe or possibly by a need to transfer NAS signalling
Realized by: Signalling
RRC_Connected to RRC_Messaging_Connected_Unleashed
Support for this transition is not critical and is shown as not supported in the diagram. If a mobile terminal is currently engaged in an SMS transfer or a NAS signalling exchange then the system should remain in RRC_Connected state. If the system is in RRC_Connected and all data transfers have ceased and/or there has been a period of inactivity then a transition to RRC_Idle is expected instead.
RRC_Messaging_Connected_Leashed to RRC_Idle
Trigger: Inactivity timer expires or all outstanding message transfer conversations have completed
Realized by: Signalling
RRC_Idle to RRC_Messaging_Connected_Leashed
It would not be essential to support this transition (hence dotted line).
Trigger: The transition might be triggered if an application was started for which it was a priori known that only a messaging bearer would be initially required and if it were additionally known that the frequency of messaging, frequency of cell change or link reliability requirement would be such that a leashed mobility management approach (handover or cell reselection with cell update) should be supported.
Realized by: Signalling
RRC_Messaging_Connected_Leashed to RRC_Connected
Trigger: This transition could be triggered by the need to set up an IP pipe or possibly by a need to transfer NAS signalling
Realized by: Signalling
RRC_Connected to RRC_Messaging_Connected_Leashed
Trigger: Support for this transition is non-essential. Whether or not the transition should be supported would depend on whether there are efficiencies to be gained by working in RRC_Messaging_Connected_Leashed mode (for example through use of MTC/messaging optimised PHY/MAC/RLC/PDCP).
Realized by: Signalling
RRC_Connected to RRC_Idle
Trigger: Inactivity timer expires
Realized by: Signalling
RRC_Idle to RRC_Connected
Trigger: mobile terminal requires EPS bearer (IP pipe) to be established or possibly required for the transfer of NAS signalling
Realized by: Signalling Note that transition between from/to cell reselection and handover based mobility management within the RRC_Messaging_Connected_Leashed state may be triggered when frequency of messaging exceeds/reduces below threshold and/or number of cell changes per unit time exceeds/reduces below a threshold.

Figure 22:
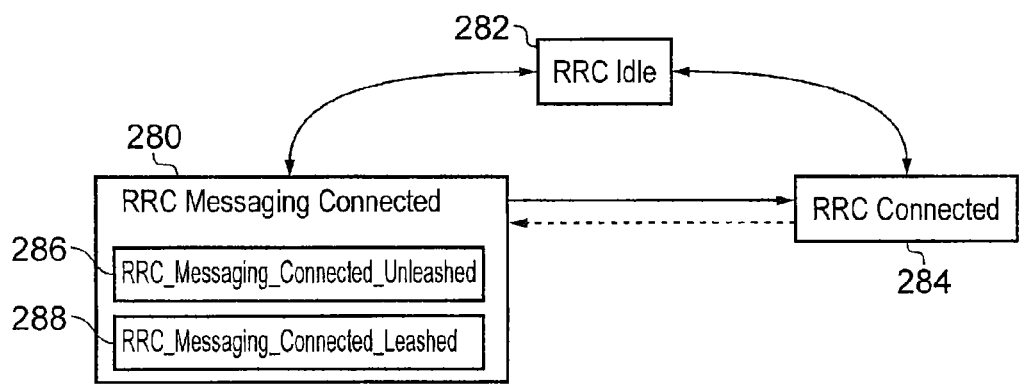

An alternative arrangement for including the RRC message in connected unleashed and leashed states is shown in FIG. 22. Accordingly a transition between the states and sub states is performed internally within the RRC messaging connected state 280.

According to the present technique the mobile terminal and the base station to which it is attached may transition between the various states shown in FIG. 20 dependent on the need to support functionality and whether for example only messaging needs to be supported or whether an IP pipe is required. Within the messaging connected state 280 and depending upon a relative number of packets generated and/or the frequency of cell change, the mobile terminal and the base station may transition between the unleashed and leashed states, the leashed state being used for more frequently generated data packets or higher frequency of cell change than is the case for the unleashed state. Of course where no data is to be sent then the mobile terminal transitions to the RRC idle state 282.

Figure 23:
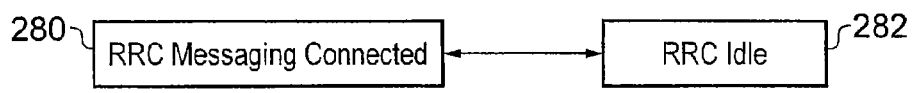

In a more simplified arrangement a mobile terminal and base station could form the messaging state shown in FIG. 23 in which the terminal can only transition to the RRC messaging connected state 280 or the idle state 282 thus providing an even more simplified representation of possible states.

Figure 24:
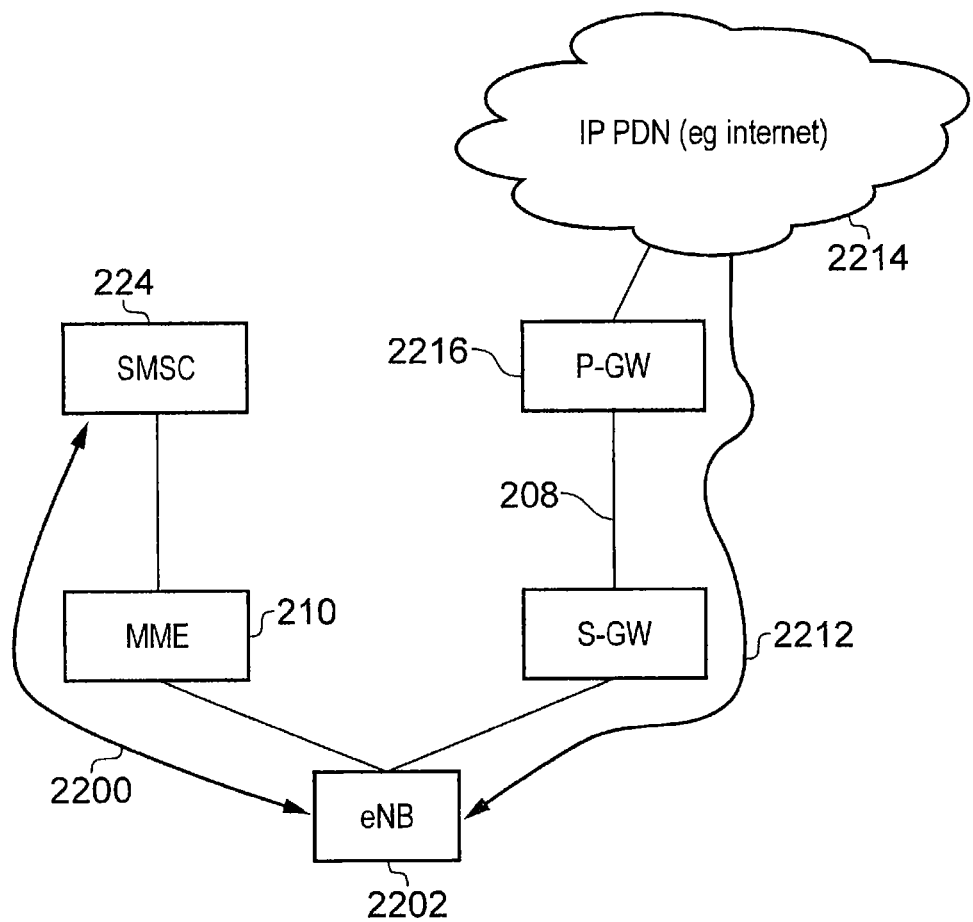
FIG. 24 is a schematic illustration of a path of packets through elements of the mobile communications network for both a conventional RRC connected state and an RRC messaging connected state in accordance with the present technique.

An illustration of a difference between the communication of data packets which is supported for the RRC_Messaging_Conneeted state and the RRC_Connected state is illustrated in FIG. 24. As shown in FIG. 24, for the RRC_Messaging_Connected state, application packets are communicated to/from the mobile terminal 2200 via an eNB 2202 and MME 2210 from/to the MTC-SC 2204, whereas for the RRC_Connected state data packets are communicated 2212 to/from the mobile terminal either via the eNB 2202, PDN_GW 2216 and S_GW 2212 to/from IP PDN 2214 and/or via the control plane 2200 to/from the MTC-SC.

Figure 25:
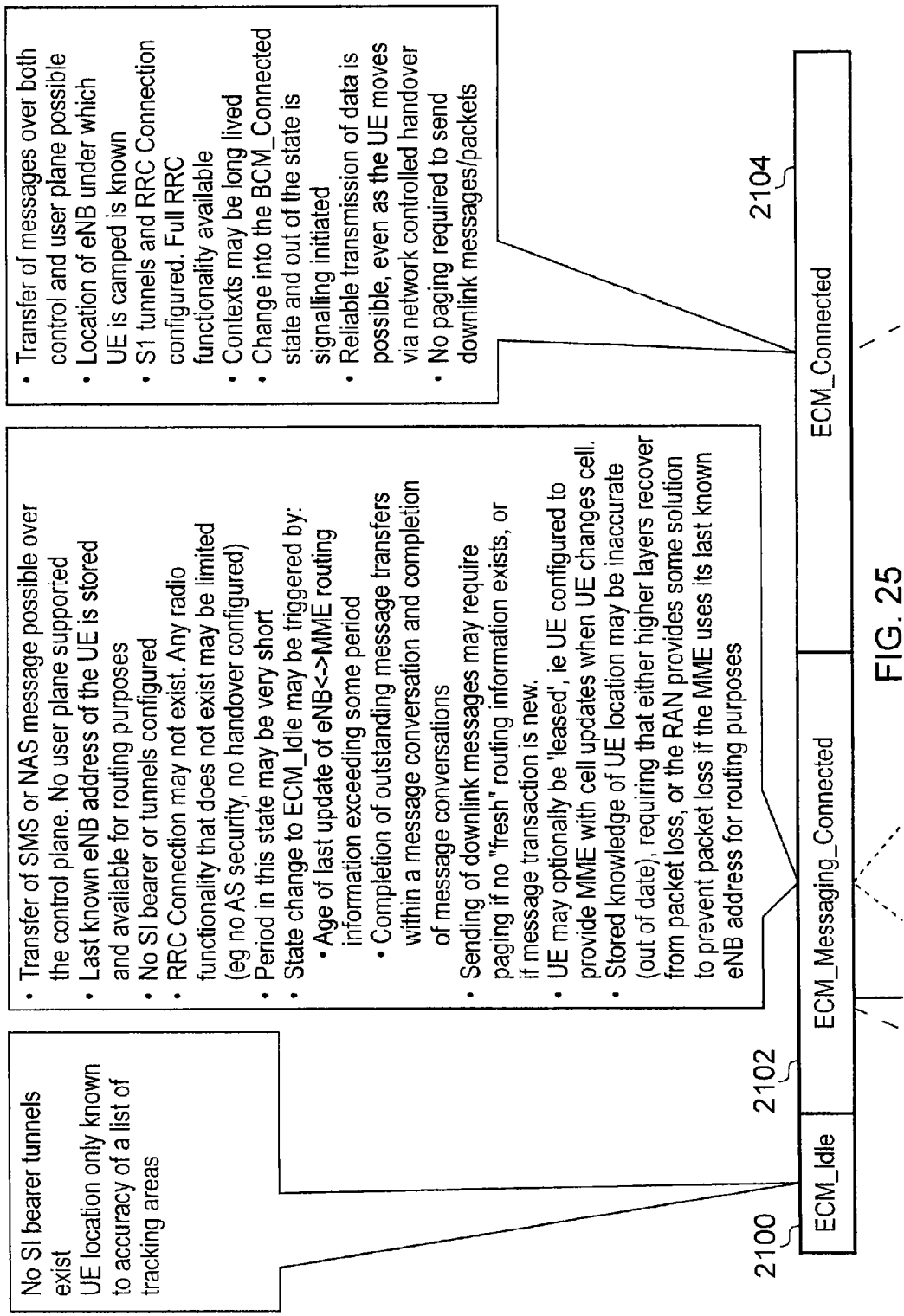
FIG. 25 is a table illustrating a relationship between the RRC messaging connected leashed/unleashed states and the ECM Idle, ECM messaging connected and the ECM connected states.
Figure 25:
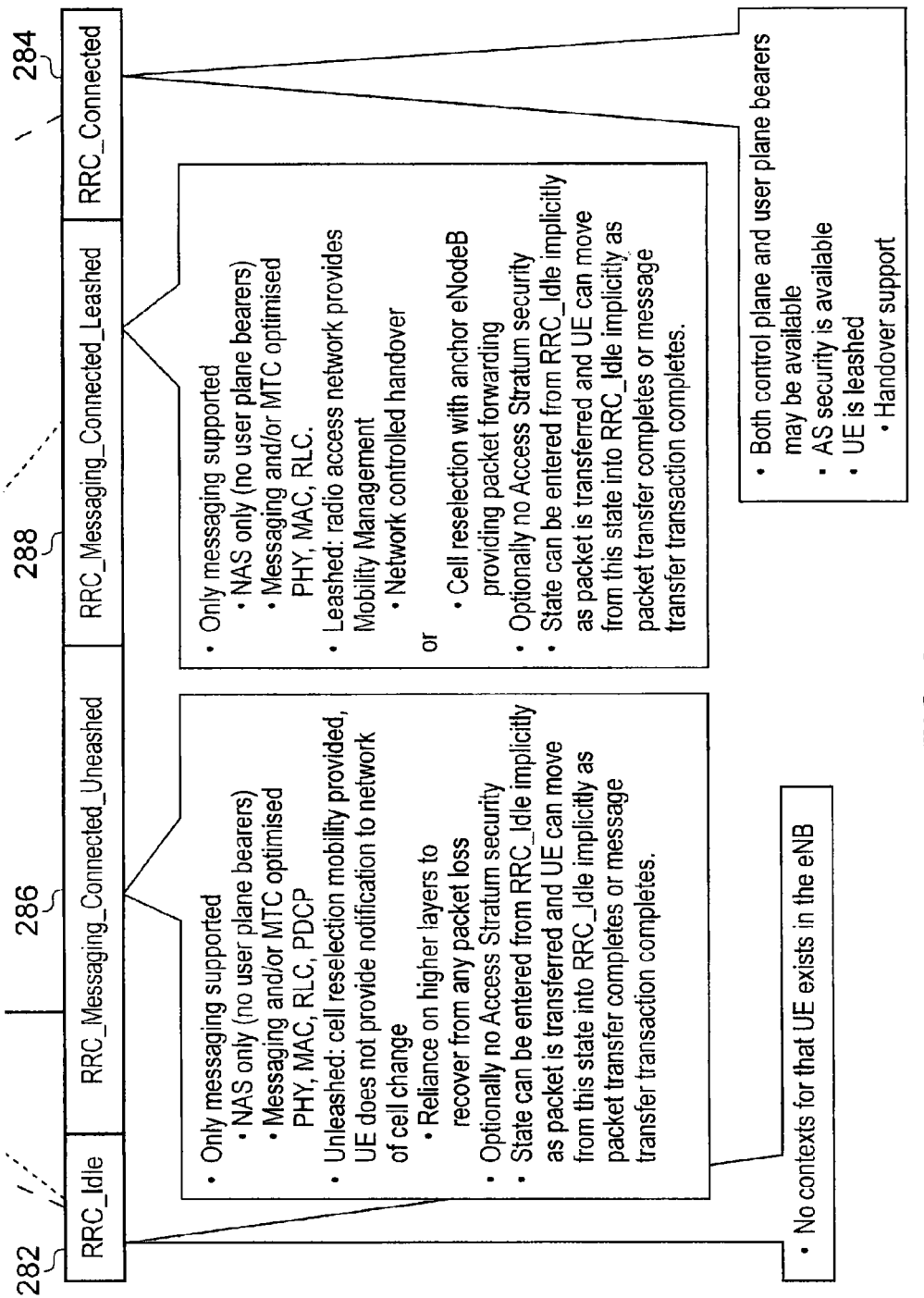

A schematic block diagram summarising the relative states explained above with reference to FIGS. 20 to 24 is shown in FIG. 25 in association with states corresponding to NAS signalling connections providing communications between the mobile terminal and the MME. In particular, a new ECM_Messaging state is introduced; properties of the state include the following:

Only transfer of SMS or NAS messages over the control plane is supported, no user plane is supported.
The last known eNB address of the UE may be stored and made available for routing of packets which arrive later on during the period while the MME is in this state.
No S1 bearer or tunnels are configured
An RRC Connection may not exist and any radio functionality that does exist may be limited (eg no AS security, no handover configured)
Period in this state may be very short
State change from ECM_idle to ECM_Messaging_Connected at the MME may be triggered:
   Implicitly by the arrival of a packet within a message transfer transaction.
State change from ECM_Messaging to ECM_Idle may be triggered by:
   Age of last update of eNB<->MME routing information exceeding some period
   Completion of single message transfer, completion of outstanding message transfers within a message conversation and/or completion of all outstanding message conversations
   Inactivity timer
The MME may need to page to find the UE's location if no sufficiently recent routing information exists, or if a network initiated message transaction is new.
The UE may optionally be 'leashed' to the MME, specifically the UE could be configured via signalling to provide the MME with cell updates when the UE changes cell. The decision to invoke this signalling may be triggered by the quantity of paging messages per unit time exceeding some quantity and/or if the frequency of short message conversations becomes high.
Stored knowledge of UE location may be inaccurate or more specifically out of date. This may be dealt with by requiring that higher layers such as NAS or PSM recover from any packet loss which results from the MME forwarding a packet to an eNB under which the UE is no longer camped. Alternatively the RAN could provide a mobility management solution to prevent packet loss if the MME uses its last known eNB address for routing purposes, for example according to the methods described earlier.

As indicated by the dotted lines in FIG. 25, whilst the MME NAS is in ECM_Messaging_Connected state the RRC state can be variously in RRC_Idle or an RRC_Messaging_Connected state dependent on the radio solution adopted, and as described previously. The ECM_Connected state is most commonly associated with the RRC_Connected state.

Routing information in the MME concerning which eNB the UE is camped under may be updated by a number of means:
   Response to paging performed by the MME
   Inclusion of routing information in any mobile originated packet/messsage that transits the MME
   Through configuring the UE to send a cell update to the MME every time a cell change occurs
   By the eNB notifying the MME if a cell change occurs which may be possible if the RAN is in an RRC_Messaging_Connected_Leashed state.

Examples of Communicating Short Messages to Base Stations

As indicated above the present technique provides an arrangement for communicating a message from a mobile terminal to a base station using a temporary or reduced RRC connection, which may be described in the sense of the present technique as being a context-less, although it will be appreciated that this is a somewhat figurative description.

A mobile communications network which operates in accordance with a conventional arrangement, an RRC connection exists when mobile terminal and a base station (eNB) and a mobility manager (and perhaps MME) have exchanged sufficient information that the base station and the mobile terminal can start communicating messages to one another to provide a communications service to a user. This situation can be distinguished from an arrangement in which the base station and the mobile terminal are allowed to transmit some types of messages to one another prior to the RRC connection being established, simply for the purposes of establishing the RRC connection in the first place. These messages, which are communicated prior to and without an RRC context being established include for example, an RRC Connection Request, RRC Connection Setup and RRC Connection Setup Complete. In addition it is allowable for lower layer (PHY, MAC) messages to be conveyed prior to the RRC connection being in place. These lower layer (PHY, MAC) communications also support the transmission of the higher layer RRC messages and include the communications occurring as part of the RACH procedure for example. Conventionally, the process of establishing an RRC connection might include agreeing the physical (PHY) layer features which are going to be used, what radio resources can be used, what radio network temporary identifiers might be used (provided by the base station to the mobile terminal in the RRC Connection setup message) and for example to which mobility manager (MME) the higher layer messages should be routed, provided by the mobile terminal in the RRC Connection setup Request/Complete etc.

When an RRC connection is first established it supports just one (signalling) radio bearer and hence only allows RRC messages to be conveyed between a mobile terminal a base station (radio signalling layer 3 messages), although NAS messages 'transparently' 'contained' within the RRC message can also be sent. Once the RRC connection is in place it can be modified to support a variety of additional 'bearers', for example an additional signalling radio bearer may be specified, which for example may have lower priority than the first signalling bearer and also additional bearers may be configured for the conveyance of application layer traffic. The additional bearers may require reconfiguration of the PHY, MAC and RLC layers.

According to the present technique a temporary or reduced RRC connection is established in order to communicate a short message across the wireless access interface between a mobile terminal and a base station (eNB) with a minimum of signalling. To this end parameters for communicating the short message via the wireless access interface are established in accordance with a default or predetermined setting. This is because in order to reduce the complexity of setting up and communicating the short message via the wireless access interface a fixed set of physical layer parameters may be selected for communicating the short message in order to communicate the short message without an exchange of messages which would normally be required if a radio bearer was being established for communicating a longer message sequence. This is because the message itself is short and so it is not efficient to set up an optimal configuration of radio access parameters for transferring a subsequent stream of messages. It is only necessary to communicate one message, or perhaps two if the message and its acknowledgement are communicated using the same parameters (ACK).

In order to reduce signalling, in one example, physical (PHY) layer, medium access control (MAC) layer and radio link control (RLC) layer configuration is as far as possible fixed at a default reduce radio context setting. As with a conventional arrangement it is possible to transfer some information prior to or as part of the RRC Connection being setup, so a short message is conveyed without the need for a full blown RRC Connection to have been set up. Thus in the same way that an RRC connection request is communicated using predetermined radio access parameters, the short message is communicated using predetermined radio access parameters which are specific to it.

According to the present technique, in one example mobile terminals 101, 201 and the base stations 102, 202 are provided with some memory for storing information pertinent to the communication of a short message from the mobile terminal 101, 201 to the base station 102, 202. In the above description a state in which the mobile station 101, 201 and the base station 102, 202 retains radio access parameters which are to be applied to the wireless access interface for communicating the short message is referred to as a 'RRC_messaging_connected' state. In this state therefore the stored radio access parameters provide some minimal amount of context information which can be applied to the communication of all short messages or short packet transfers, for example for the purposes of supporting a simple stop and wait ARQ.

There are two alternatives which govern how long a mobile terminal 101, 201 stays in the RRC_messaging_connected state, which are:

1. The reduced context exists only as long as is necessary to convey one packet. Once the packet has been conveyed all contextual information disappears. In a two step short message transfer, the mobile terminal and the base station will be in RRC_messgaing_connected state twice, once for the message transfer (eg in uplink) and separately once for the transfer of the ACK from the SMS-SC (eg in the downlink).
2. In another variant, the mobile terminal entyers an RRC_messaging_connected state for the purposes of conveying a short message and therefore the context lasts for the transmission of the short message data packet, and during a gap between the short message and the acknowledgement (ACK) and for the transmission of the ACK. Once the ACK has been successfully conveyed the context disappears and the system is no longer in RRC_messaging_connected state. In other words the system is only in RRC_messaging_connected state once during the short message transfer and transition out of the state and back to idle is implicit when the ACK has been successfully conveyed.

As will be appreciated for the two examples above, the contextual information will vary during a period for which the mobile terminal is in the RRC_messaging_connected state.

According to the above examples there are then at least two distinctive variants for conveying short messages via the wireless access interface, which differ principally only in terms of how much contextual information is exchanged/stored. However both of these examples require much less context/signalling communication than in a conventional existing packet communications such as would be required in an LTE system, for example:

Variant 1: PHY layer loops are trained up prior to (and perhaps between) short messages being sent. This include for example exchange of information necessary to make power level settings, choices on modulation/coding schemes, what frequency and time slot/time resources to use, what timing advance to use etc.

Variant 2: PHY loops may not be established, which is more of an open loop approach. This therefore may require that data is transmitted at higher power levels, which are determined perhaps by open loop estimates of path loss, and code words making up the data of the short message are transmitted over multiple times, frequencies and/or spatial dimensions to get diversity benefit. However this is achieved in an open loop sense in that there is no attempt to channel sound to pick and choose the optimal resources. More use may be made of so-called common channels, for example using PRACH for data transfer.

Figure 26:
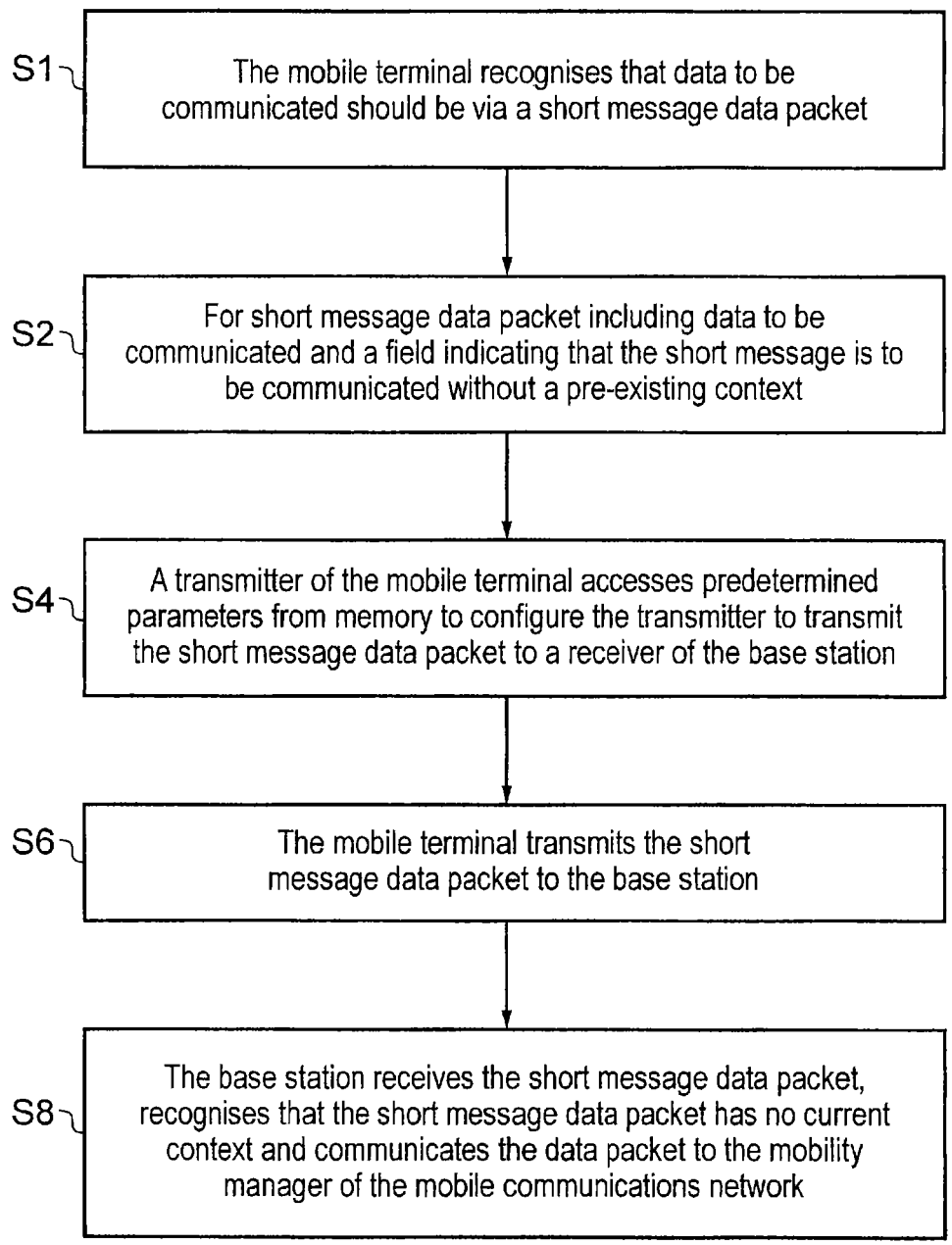
FIG. 26 provides an illustrative flow diagram of a process in which a short message is transmitted by a mobile terminal in a context-less manner.

As will be appreciated from the above explanation the transmission of a short message by a mobile terminal can be summarised by the flow diagram shown in FIG. 26 and summarised as follows:

S1: The mobile terminal recognises that the data to be communicated is a short message; this may be provided for example by an indication from an application layer which has generated the message or, if the device is a simplified device such as an MTC type device, the indication may be provided by lower layers in the protocol stack;

S2: The short message is formed with the data to be communicated to the SMS-C via the MME, without a context or at least a temporary or reduced context and includes a field which indicates that the short message is being communicated without a pre-existing context;

S4: Accessing pre-configured parameters for at least the PHY layer, for communicating the short message via the wireless access interface. The pre-configured parameters may also include other layers in the protocol stack shown in FIG. 14 such as the MAC layer and the RLC layer, to ensure that both the mobile terminal transmitter side and the base station receiver side are able to establish pre-determined transmission parameters to communicate the short message. For the example of the PHY layer the pre-determined parameters may include for example an error correction coding scheme and a modulation scheme for the transmitter and a receiver chain, as well as time slots and frequencies on which the radio transmission is made and a transmission power level setting etc. The pre-determined parameters which are stored in a memory of the mobile terminal will depend on the wireless access interface being used to communicate the short message. The base station is configured with corresponding parameters to receive the short message. For example, the predetermined parameters may be arranged to configure a receiver in the base station to receive the short message at predetermined times and at predetermined frequencies, using coding and modulation which are used by the transmitter in the base station. Thus the predetermined parameters are provided to the mobile station and the base station to the effect that the short message can be transmitted without a message exchange which would usually be associated with establishing a context for the communication of the short message data packet via the wireless access interface.

S6: Having accessed the pre-determined parameters for communicating the short message, the short message is communicated from the mobile terminal to the base station;

S8: The base station receives the short message from the mobile terminal, recognises the field indicating that the message is a short message for which no context currently exists and communicates the short message to the MME, by establishing a temporary context for that purpose.

As will be appreciated providing the short message with a field indicating that it is a short message, that it should be communicated to the MME and that it has no existing context differs from prior art arrangements such as an IP packet which includes source and destination addresses that enable the packet to be routed and an existing LTE system, in which an RRC Connection Setup Complete message may contain information providing an indication of which MME an embedded NAS (eg Service Request) message should be sent.

CONCLUSION

Generally, the invention has been described in an LTE environment as the invention can be advantageously implemented in this environment, however the invention is not limited to an LTE environment and may be implemented in any other suitable environment.

Various modifications can be made to examples of the present invention. Embodiments of the present invention have been defined largely in terms of reduced capability terminals, however, it will be understood that any suitable terminal can transmit and receive short messages according to the present disclosure, including conventional terminals such as a personal phone.

Also, for the ease of illustration and in the interest of intelligibility, only one node for each element of the network has been represented and discussed. However, the skilled person will understand that there may be more than one of each node. For example, the mobile network may comprise a plurality of eNB, of MME, of S-GW and/or of P-GW.

Further various aspects and features of example embodiments are presented in the following numbered clauses:

1. A mobile communications network for communicating data packets to or from one or more mobile communications terminals, the mobile communications network comprising a radio network part including a plurality of base stations for communicating data packets to or from the mobile communications terminals via a radio access interface, and a core network part which is configured to communicate the data packets to destination addresses from the radio network part or to communicate the data packets to the radio network part from source addresses, the mobile communications network being configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses, wherein one of the mobile communications terminals is configured to attach to one of the base stations, when in an idle state, to communicate a short message data packet to the base station of the radio network part as a signalling message, the short message data packet including an indication of context information for use by the mobile communications network for communicating the short message data packet to a mobility manager of the mobile communications network.

2. A mobile communications network according to clause 1, wherein the context information provided in the short message packet includes an identifier of the mobile communications terminal, which was provided to the mobile communications terminal by the mobile communications network, when the mobile communications terminal attached to the base station of the mobile communications network.

3. A mobile communications network according to clause 2, wherein the identifier of the mobile communications terminal is a temporary international mobile subscriber identity number.

4. A mobile communications network according to any preceding clause, wherein the short message data packet includes a field identifying the short message data packet to the base station, which the base station should communicate to a mobility manager.

5. A mobile communications network according to any preceding clause, wherein the predetermined parameters for configuring the transmitter of the mobile communications terminal with the effect that the short message data packet can be communicated to the base station establish a temporary context between the communications terminal and the base station, the temporary context providing a radio bearer for communicating the short message data packet between the communications terminal and the base station.

6. A mobile communications network according to any preceding clause, wherein the communications terminal and the base station are configured to remove the radio bearer after the short message data packet has been received by the base station.

7. A mobile communications network according to any of clauses 1 to 5, wherein the mobile communications terminal and the base station are configured to remove the radio bearer after communicating an acknowledgement message to the mobile communications terminal, the acknowledgement message being communicated from the mobility manager to acknowledge receipt of the short message data packet has been received by the base station.

8. A mobile communications network according to any of clauses 1 to 7, wherein the predetermined parameters for configuring the transmitter of the mobile communications terminal with the effect that the short message data packet can be communicated to the base station, include at least one of a power control level setting a paower with which a radio signal representing the short message data packet is transmitted, modulation and encoding of the data of the short message data packet for communicating the short message data packet from the mobile communications terminal to the base station.

9. A mobile communications network for communicating data packets to or from one or more mobile communications terminals, the mobile communications network comprising a radio network part including a plurality of base stations for communicating data packets to or from the mobile communications terminals via a radio access interface, and a core network part which is configured to communicate the data packets to destination addresses from the radio network part or to communicate the data packets to the radio network part from source addresses, the mobile communications network being configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses, wherein a base station of the mobile communications network is configured to receive a short message data packet as a signalling message, from one of the mobile terminals when the mobile terminal is attached to the base station and is in an idle state, the short message data packet including an indication of context information for use by the mobile communications network for communicating the short message data packet, and to communicate the short message data packet to a mobility manager of the core network using the context information included in the short message data packet.

10. A base station for a mobile communications network for communicating data packets to or from one or more mobile communications terminals via a wireless access interface, the mobile communications network being configured to communicate the data packets to destination addresses from the base station or to communicate the data packets to the base station from source addresses, the mobile communications network being configured to establish communications bearers for communicating the data packets to or from the one or more mobile communications terminals, each of the communications bearers being established using context information associated with one or more connections from the mobile communications terminals to the destination addresses, or to the mobile communications terminals from source addresses, wherein the base station is configured to receive a short message data packet as a signalling message, from one of the mobile terminals when the mobile terminal is attached to the base station and is in an idle state, the short message data packet including an indication of context information for use by the mobile communications network for communicating the short message data packet, and to communicate the short message data packet to a mobility manager of the mobile communications network using the context information indicated with the short message data packet.

11. A method of communicating a short message data packet via a mobile communications network from a communications terminal, the mobile communications network comprising a radio network part including a plurality of base stations for communicating data packets to or from the mobile communications terminals via a radio access interface, and a core network part which is configured to communicate the data packets to destination addresses from the radio network part or to communicate the data packets to the radio network part from source addresses, the mobile communications network being configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses, the method comprising communicating a short message data packet to one of the base stations of the mobile communications network as a signalling message, after the communications terminal has attached to the base station, and when the communications terminal is in an idle state, the short message data packet including an indication of context information for use by the mobile communications network for communicating the short message data packet.

Various further aspects and features of the present invention are defined in the appended claims. Various modifications may be made to the embodiments described above without departing from the scope of the present invention. For example, embodiment of the present invention finds application with other types of mobile communications networks and is not limited to LTE.

The invention claimed is:

1. A mobile communications network for communicating data packets to or from one or more mobile communications terminals, the mobile communications network comprising:
    a radio network part including a plurality of base stations for communicating data packets to or from the mobile communications terminals via a radio access interface, and
    a core network part which is configured to communicate the data packets to destination addresses from the radio network part or to communicate the data packets to the radio network part from source addresses, the mobile communications network being configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses,
    wherein one of the mobile communications terminals is configured to
    when in an idle state, communicate a short message data packet to one of the base stations of the radio network part as a signaling message using predetermined parameters for configuring a transmitter of the mobile communications terminal, which correspond with parameters with which a receiver in the base station is configured to receive the short message data packet, the short message data packet including an indication of context information for use by the mobile communications network for communicating the short message data packet to a mobility manager of the mobile communications network, and
    wherein the predetermined parameters for configuring the transmitter of the mobile communications terminal with the effect that the short message data packet is communicable to the base station include at least one of a power control level setting a power with which a radio signal representing the short message data packet is transmitted, modulation and encoding of the short message data packet for communicating the short message data packet from the mobile communications terminal to the base station using the radio signal.

2. The mobile communications network as claimed in claim 1, wherein the context information provided in the short message packet includes an identifier f the mobile communications terminal, which was provided to the mobile communications terminal by the mobile communications network, when the mobile communications terminal attached to the base station of the mobile communications network.

3. The mobile communications network as claimed in claim 2, wherein the identifier of the mobile communications terminal is a temporary international mobile subscriber identity number.

4. The mobile communications network as claimed in claim 1, wherein the short message data packet includes a field identifying the short message data packet to the base station, for which the base station should communicate to a mobility manager.

5. The mobile communications network as claimed in claim 1, wherein the predetermined parameters for configuring the transmitter of the mobile communications terminal with the effect that the short message data packet is communicable to the base station establish a temporary context between the communications terminal and the base station, the temporary context providing a radio bearer for communicating the short message data packet between the communications terminal and the base station.

6. The mobile communications network as claimed in claim 1, wherein the communications terminal and the base station are configured to remove the radio bearer after the short message data packet has been received by the base station.

7. The mobile communications network as claimed in claim 1, wherein the mobile communications terminal and the base station are configured to remove the radio bearer after an acknowledgement message has been communicated to the mobile communications terminal, the acknowledgement message being communicated from the mobility manager to the mobile communications terminal to acknowledge receipt of the short message data packet by the mobility manager.

8. A method of communicating a short message data packet via a mobile communications network from a communications terminal, the mobile communications network comprising a radio network part including a plurality of base stations for communicating data packets to or from the mobile communications terminals via a radio access interface, and a core network part which is configured to communicate the data packets to destination addresses from the radio network part or to communicate the data packets to the radio network part from source addresses, the mobile communications network being configured to establish communications bearers for communicating the data packets to or from the mobile communications terminals via the radio network part and the core network part, each of the communications bearers being established using context information associated with one or more connections from the mobile communications terminals to the destination addresses, or to the mobile communications terminals from source addresses, the method comprising:
   when in an idle state, communicating a short message data packet, using the communications terminal, to one of the base stations of the mobile communications network as a signaling message, after the communications terminal has attached to the base station, and
   when the communications terminal is in the idle state, using predetermined parameters for configuring a transmitter of the mobile communications terminal, which correspond with parameters with which a receiver of the base station is configured to receive the short message data packet, the short message data packet including an indication of context information for use by the mobile communications network for communicating the short message data packet to a mobility manager of the mobile communications network,
   wherein the predetermined parameters for configuring the receiver of the base station with the effect that the short message data packet is receivable include at least one of a power control level setting a power with which a radio signal representing the short message data packet is transmitted, modulation and encoding of the data of the short message data packet for communicating the short message data packet from the mobile communications terminal to the base station using the radio signal.

9. A base station for a mobile communications network for communicating data packets to or from one or more mobile communications terminals via a wireless access interface, the mobile communications network being configured to communicate the data packets to destination addresses from the base station or to communicate the data packets to the base station from source addresses, the mobile communications network being configured to establish communications bearers for communicating the data packets to or from the one or more mobile communications terminals, each of the communications bearers being established using context information associated with one or more connections from the mobile communications terminals to the destination addresses, or to the mobile communications terminals from source addresses, the base station comprising:
   circuitry configured to
   receive a short message data packet as a signaling message, from one of the mobile terminals when the mobile terminal is attached to the base station and is in an idle state, the short message data packet including an indication of context information for use by the mobile communications network for communicating the short message data packet,
   wherein the short message data packet is received by using predetermined parameters for configuring a receiver of the base station which correspond to predetermined parameters used by a transmitter of the mobile communications terminal to transmit the short message data packet, which correspond with parameters with which a transmitter of the mobile communications terminal transmitted the short message data packet, the short message data packet including an indication of context information for use by the base station for communicating the short message data packet to a mobility manager of the mobile communications network, and
   wherein the predetermined parameters for configuring the receiver of the base station with the effect that the short message data packet is receivable include at least one of a power control level setting a power with which a radio signal representing the short message data packet is transmitted, modulation and encoding of the data of the short message data packet for communicating the short message data packet from the mobile communications terminal to the base station using the radio signal.

10. The base station as claimed in claim 9, wherein the circuitry of the base station is configured to
   provide an identifier of the mobile communications terminal to the mobile communications terminal, when the mobile communications terminal is attached to the base station,
   recognize that no communications bearer has been established for the mobile terminal for communicating the short message data packet, and derive the context information provided in the short message packet using the identifier of the mobile communications terminal.

11. The base station as claimed in claim 10, wherein the identifier of the mobile communications terminal is a temporary international mobile subscriber identity number.

12. The base station as claimed in claim 9, wherein the predetermined parameters for configuring the receiver of the base station with the effect that the short message data packet transmitted by the mobile communications terminal is receivable by the base station, establish a temporary context between the communications terminal and the base station, the temporary context providing a radio bearer for communicating the short message data packet between the communications terminal and the base station.

13. The base station as claimed in claim 9, wherein the communications terminal and the base station are configured to remove the radio bearer after the short message data packet has been received by the base station.

14. The base station as claimed in claim 9, wherein the base station is configured to remove the radio bearer after communicating an acknowledgement message has been communicated to the mobile communications terminal, the acknowledgement message being communicated from the mobility manager to the mobile communications terminal to acknowledge receipt of the short message data packet by the mobility manager.

* * * * *